United States Patent
Frei et al.

(10) Patent No.: US 12,285,749 B2
(45) Date of Patent: Apr. 29, 2025

(54) ZONED REACTOR FOR THE REFORMING OF $NH_3$

(71) Applicant: BASF SE, Ludwigshafen am Rhein (DE)

(72) Inventors: Elias Christopher Frei, Ludwigshafen am Rhein (DE); Matthias Felischak, Ludwigshafen am Rhein (DE); Lukasz Karwacki, Ludwigshafen am Rhein (DE); Nils Bottke, Ludwigshafen am Rhein (DE); Peter Heidebrecht, Ludwigshafen am Rhein (DE)

(73) Assignee: BASF SE

( * ) Notice: Subject to any disclaimer, the term of this patent is extended or adjusted under 35 U.S.C. 154(b) by 0 days.

(21) Appl. No.: 18/728,504

(22) PCT Filed: Apr. 6, 2023

(86) PCT No.: PCT/EP2023/059124
§ 371 (c)(1),
(2) Date: Jul. 12, 2024

(87) PCT Pub. No.: WO2023/194526
PCT Pub. Date: Oct. 12, 2023

(65) Prior Publication Data
US 2025/0001380 A1    Jan. 2, 2025

(30) Foreign Application Priority Data
Apr. 8, 2022   (EP) ..................................... 22167434

(51) Int. Cl.
*B01J 8/04*   (2006.01)
*B01J 23/58*   (2006.01)
(Continued)

(52) U.S. Cl.
CPC ........... *B01J 8/0492* (2013.01); *B01J 8/0496* (2013.01); *B01J 23/58* (2013.01); *B01J 23/78* (2013.01);
(Continued)

(58) Field of Classification Search
None
See application file for complete search history.

(56) References Cited

U.S. PATENT DOCUMENTS

| | | | |
|---|---|---|---|
| 8,623,285 B2 * | 1/2014 | Grannell | ................. C01B 3/047 422/198 |
| 2005/0037244 A1 * | 2/2005 | Goetsch | ................... B01J 35/57 429/441 |

(Continued)

FOREIGN PATENT DOCUMENTS

| | | |
|---|---|---|
| WO | 2010/116874 A2 | 10/2010 |
| WO | 2013/004649 A1 | 1/2013 |

(Continued)

OTHER PUBLICATIONS

International Preliminary Report on Patentability received for PCT Patent Application No. PCT/EP2023/059124, mailed on Mar. 27, 2024, 9 pages.

(Continued)

*Primary Examiner* — Joseph D Anthony
(74) *Attorney, Agent, or Firm* — Faegre Drinker Biddle & Reath LLP

(57) ABSTRACT

The present invention relates to an adiabatic, zoned reactor for the reforming of $NH_3$ to $N_2$ and $H_2$, the reactor particularly comprising n reaction zones arranged in sequence and extending along the axial length L of the reactor, wherein n is an integer in the range of from 2 to 5, wherein independently from one another, each of the n reaction zones comprises one or more catalytic components, wherein from (Continued)

the inlet reaction zone to the outlet reaction zone each reaction zone displays a lower light-off temperature T50 in the reforming of $NH_3$ to $N_2$ and $H_2$ then the subsequent downstream one. Further, the present invention relates to a production unit comprising said reactor, a process for the reforming of $NH_3$ to $N_2$ and $H_2$, and use of said reactor and said production unit.

15 Claims, 10 Drawing Sheets

(51) Int. Cl.
    *B01J 23/78*      (2006.01)
    *C01B 3/04*      (2006.01)

(52) U.S. Cl.
    CPC ..... *C01B 3/047* (2013.01); *B01J 2208/00168* (2013.01)

(56) References Cited

U.S. PATENT DOCUMENTS

| | | | |
|---|---|---|---|
| 2007/0178034 A1* | 8/2007 | Hojlund Nielsen | B01D 53/8612 423/242.1 |
| 2010/0150810 A1* | 6/2010 | Yoshida | C01B 3/025 568/876 |
| 2014/0105816 A1* | 4/2014 | Grannell | C01B 3/06 422/198 |
| 2020/0062590 A1 | 2/2020 | McCullough et al. | |
| 2020/0398240 A1 | 12/2020 | Jiang et al. | |

FOREIGN PATENT DOCUMENTS

| WO | 2013/068905 A1 | 5/2013 |
|---|---|---|
| WO | 2020/157202 A1 | 8/2020 |

OTHER PUBLICATIONS

International Search Report and Written Opinion received for PCT Patent Application No. PCT/EP2023/059124, mailed on Aug. 4, 2023, 10 pages.

Lucentini et al., "Review of the Decomposition of Ammonia to Generate Hydrogen", Ind. Eng. Chem. Res, vol. 60, No. 51, May 21, 2021, pp. 18560-18611.

Osborne et al., "A flexible tool for methanol synthesis", Nitrogen+ Syngas, Oct. 2021, pp. 1-6.

\* cited by examiner

3A

3B

ZONED REACTOR FOR THE REFORMING OF NH$_3$

CROSS-REFERENCE TO RELATED APPLICATIONS

This application is a National stage application (under 35 U.S.C. § 371) of PCT/EP2023/059124, filed Apr. 6, 2023, which claims benefit of European Application No. 22167434.4, filed Apr. 8, 2022, both of which are incorporated herein by reference in their entirety.

TECHNICAL FIELD

The present invention relates to a zoned reactor, a production unit comprising said reactor, and a process for the reforming of NH$_3$ to N$_2$ and H$_2$. Further, the present invention relates to the use of said reactor and said production unit. A schematic view of a zoned reactor in accordance with the present invention is shown in FIG. 1.

INTRODUCTION

NH$_3$ is increasingly seen as an energy vector, especially since it can be used to store significant amounts of H$_2$. Sustainable NH$_3$ (so called "blue" or "green" NH$_3$) might be produced on a large scale from regenerative energy sources. The reforming of NH$_3$ (equation I) on site, where the H$_2$ is needed, might be the last step in closing an H$_2$ value chain based on renewable electricity. To have direct access to H$_2$ at elevated pressure (e.g. in the range of from 10 to 80 bara), the NH$_3$-reforming itself could also be conducted at these pressures.

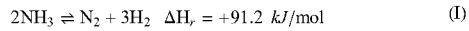

$$2NH_3 \rightleftharpoons N_2 + 3H_2 \quad \Delta H_r = +91.2 \; kJ/mol \quad (I)$$

Typically, said endothermic reaction is carried out in processes at temperatures between 25° and 750° C. and pressures of up to 80 bara.

US 2020/0062590 A1 relates to NH$_3$ decomposition catalyst systems. In particular, an NH$_3$ decomposition system is disclosed therein comprising a support material and a catalyst component, the catalyst component comprising Ru and at least one additional metal that catalyzes and/or promotes NH$_3$ decomposition.

WO 2013/004649 A1 relates to an adiabatic reaction cascade for the production of chlorine using a cerium oxide catalyst. The adiabatic reaction cascade particularly comprises at least two reaction stages connected in series with intermediate cooling.

S. Osborne et al. disclose in Nitrogen+Syngas, 373, September-October 2021, p. 44-50, a study on a flexible tool for methanol synthesis. Based on computational examination of multi-level layered loadings as applied to a methanol reaction system, a more effective utilization of the catalyst was found to be achievable by multi-level layering in view of an isothermal operation of the reactor.

However, there remains a need for an improved reactor design with respect to the reforming of NH$_3$. Thus, it was an object of the present invention to provide a reactor for the reforming of NH$_3$ to N$_2$ and H$_2$, in particular allowing a cost and resource-efficient conversion of NH$_3$. More specifically, it was an object of the present invention to provide a novel reactor design for an adiabatic reactor, wherein especially the catalysts may be employed in a more efficient manner, thus allowing for an improved conversion and/or a more compact reactor design.

DETAILED DESCRIPTION

It has surprisingly been found that said problem can be solved by a novel zoned concept in a reactor, in particular by employing a high temperature active catalyst in the inlet part and a low temperature active catalyst in the outlet part of an adiabatic reactor.

Thus, the present invention relates to a zoned concept for adiabatic reactors, wherein each catalyst operates at advantageous temperatures, thus, allowing application of a comparatively large temperature window and an efficient use of the used catalysts. In particular, a high temperature active catalyst operating in a possible temperature window of from for example 750° C. to 500° C. can be placed in the upper (inlet) part of the reactor. As a function of the conversion along the reactor bed, the temperature of the stream decreases since the reforming of NH$_3$ is an endothermic reaction. When approaching a lower temperature of 500° C. the high temperature active catalyst becomes more and more inefficient. Then, a low temperature active catalyst allowing operation in a temperature window in the range of from for example 500° C. to 250° C. can be placed after the high temperature active catalyst in the lower (outlet) part of the adiabatic reactor. This catalyst should still be very active at 500° C. and as function of the ongoing NH$_3$-conversion the temperature further decreases until 250° C.

It was surprisingly found that the zoned concept within an adiabatic reactor enables a high NH$_3$ conversion, respectively reforming, in a relatively small reactor volume. Further, the present invention allows applying a large temperature window in the reactor, wherein each catalyst of a reaction zone is chosen based on its activity in a specific temperature range. This also allows for example the combination of a relatively cost-efficient high temperature catalyst, with a highly active low temperature catalyst, in its effective zones. Thus, the present invention enables use of any combination of low temperature active and high temperature active catalysts for this type of reaction. In sum, it was surprisingly found that the present invention not only allows an effective way of using specific catalysts with respect to the optimal temperature window, but also offers a solution which is economically favored. These findings are of advantage at any reaction pressure and are applicable in a broad variety.

Therefore, the present invention relates to a zoned reactor for the reforming of NH$_3$ to N$_2$ and H$_2$, wherein the reactor is an adiabatic rector, and wherein the reactor comprises
- a reactor inlet and a reactor outlet, the reactor inlet and the reactor outlet being separated by the axial length L of the reactor, and
- n reaction zones arranged in sequence and extending from the reactor inlet to the reactor outlet along the axial length L of the reactor, wherein n is an integer in the range of from 2 to 5,
- wherein the length of each of the n reaction zones in axial direction constitutes a fraction of the length L of the reactor, wherein the sum of the lengths of all of the reaction zones in axial direction is less than or equal to L,
- wherein independently from one another, each of the n reaction zones comprises one or more catalytic components, wherein the inlet reaction zone which is adjacent to the reactor inlet displays a higher light-off temperature T50 in the reforming of $NH_3$ to $N_2$ and $H_2$ than each of the one or more subsequent reaction zones downstream thereof, wherein the outlet reaction zone which is adjacent to the reactor outlet displays a lower light-off temperature T50 in the reforming of $NH_3$ to $N_2$ and $H_2$ than each of the one or more preceding reaction zones upstream thereof, and wherein each of the optional intermediate reaction zones between the inlet and outlet reaction zones respectively displays a light-off temperature T50 in the reforming of $NH_3$ to $N_2$ and $H_2$ which is lower than each of the one or more preceding reaction zones upstream thereof and which is higher than each of the one or more subsequent reaction zones downstream thereof, wherein the T50 light-off temperature is preferably determined according to Reference Example 1.

Within the meaning of the present application, an adiabatic reactor preferably designates a reactor of which the reactor walls are thermally isolated such that no heat exchange with the out-side of the reactor takes place. Accordingly, within the meaning of the present application, an adiabatic reactor preferably exchanges thermal energy and mass with the environment exclusively by way of the inlet and outlet of the reactor.

It is preferred that the inlet reaction zone displays a T50 light-off temperature higher than 450° C., more preferably in the range of from higher than 450 to 850° C., more preferably in the range of from 470 to 650° C., more preferably in the range of from 490 to 570° C., more preferably in the range of from 510 to 540° C., more preferably in the range of from 520 to 530° C., wherein the T50 light-off temperature is preferably determined according to Reference Example 1.

It is preferred that the outlet reaction zone displays a T50 light-off temperature equal to or lower than 450° C., more preferably in the range of from 200 to equal or lower than 450° C., more preferably in the range of from 300 to 430° C., more preferably in the range of from 340 to 410° C., more preferably in the range of from 360 to 390° C., more preferably in the range of from 370 to 380° C., wherein the T50 light-off temperature is preferably determined according to Reference Example 1.

It is preferred that the axial length L of the reactor is in the range of from 0.1 to 20 m, more preferably in the range of from 0.5 to 10 m, more preferably in the range of from 1.0 to 5.0 m, more preferably in the range of from 1.5 to 2.5 m, more preferably in the range of from 1.89 to 1.93 m.

It is preferred that the cross-section of the reactor is circular.

In the case where the cross-section of the reactor is circular, it is preferred that the reactor geometry is cylindrical, and that the reactor has a diameter D, wherein D is in the range of from 0.1 to 20 m, preferably in the range of from 0.5 to 10 m, more preferably in the range of from 1.0 to 5.0 m, more preferably in the range of from 1.5 to 2.5 m, more preferably in the range of from 1.89 to 1.93 m.

In the case where the reactor geometry is cylindrical, and wherein the reactor has a diameter D, it is preferred that the reactor displays an aspect ratio L:D of the axial length L of the reactor to the diameter D of the reactor in the range of from 0.01:1 to 1:0.01, more preferably in the range of from 0.05:1 to 1:0.05, more preferably in the range of from 0.1:1 to 1:0.1, more preferably in the range of from 0.3:1 to 1:0.3, more preferably in the range of from 0.5:1 to 1:0.5, more preferably in the range of from 0.8:1 to 1:0.8, more preferably in the range of from 0.9:1 to 1:0.9, wherein the aspect ratio L:D more preferably is 1:1.

It is preferred that n is an integer in the range of from 2 to 5, more preferably in the range of from 2 to 4, wherein more preferably n is 2 or 3, wherein the reactor more preferably comprises 2 reaction zones.

It is preferred that each of the reaction zones independently from one another has a length in the range of from $(0.01 \cdot L/n)$ to $(1.99 \cdot L/n)$, more preferably in the range of from $(0.05 \cdot L/n)$ to $(1.95 \cdot L/n)$, more preferably in the range of from $(0.1 \cdot L/n)$ to $(1.9 \cdot L/n)$, more preferably in the range of from $(0.2 \cdot L/n)$ to $(1.8 \cdot L/n)$, more preferably in the range of from $(0.5 \cdot L/n)$ to $(1.5 \cdot L/n)$, more preferably in the range of from $(0.9 \cdot L/n)$ to $(1.1 \cdot L/n)$, more preferably in the range of from $(0.95 \cdot L)/n$ to $(1.05 \cdot L)/n$, more preferably in the range of from $(0.99 \cdot L)/n$ to $(1.01 \cdot L)/n$, wherein each of the reaction zones more preferably has a length of $L/n$.

It is preferred that the one or more catalytic components comprised in each of the n reaction zones are independently from one another selected from the group consisting of Ni-containing catalysts, Fe-containing catalysts, Co-containing catalysts, Ru-containing catalysts, and mixtures thereof, more preferably from the group consisting of Ni-containing catalysts, Ru-containing catalysts, and mixtures thereof.

It is preferred that the one or more catalytic components comprised in the inlet reaction zone are selected from the group consisting of Ni-containing catalysts, Fe-containing catalysts, Co-containing catalysts, Ru-containing catalysts, and mixtures thereof, more preferably from the group consisting of Ni-containing catalysts, Ru-containing catalysts, and mixtures thereof, wherein the one or more catalytic components comprised in the inlet reaction zone are preferably one or more Ni-containing catalysts.

It is preferred that the one or more catalytic components comprised in the outlet reaction zone are selected from the group consisting of Ni-containing catalysts, Fe-containing catalysts, Co-containing catalysts, Ru-containing catalysts, and mixtures thereof, more preferably from the group consisting of Ni-containing catalysts, Ru-containing catalysts, and mixtures thereof, wherein the one or more catalytic components comprised in the outlet reaction zone are preferably one or more Ru-containing catalysts.

It is preferred that the one or more catalytic components comprised in each of the optional intermediate reaction zones between the inlet and outlet reaction zones are independently from one another selected from the group consisting of Ni-containing catalysts, Fe-containing catalysts, Co-containing catalysts, Ru-containing catalysts, and mixtures thereof, wherein the one or more catalytic components comprised in each of the optional intermediate reaction zones between the inlet and outlet reaction zones more preferably comprise independently from one another one or more catalytic components selected from the group consisting of Ni-containing catalysts, Co-containing catalysts, Ru-containing catalysts, and mixtures of two or more thereof.

In the case where the one or more catalytic components comprised in each of the n reaction zones are independently from one another selected from the group consisting of Ni-containing catalysts, Fe-containing catalysts, Co-containing catalysts, Ru-containing catalysts, and mixtures thereof, it is preferred that the one or more Co-containing catalysts and/or the one or more Ni-containing catalysts comprise a further metal M selected from the group consisting of alkali metals, alkaline earth metals, Mo, and Fe, including mixtures of two or more thereof, more preferably from the group consisting of Li, K, Na, Cs, Mg, Ca, Sr, Ba, Mo, and Fe, including mixtures of two or more thereof, more preferably from the group consisting of K, Na, Cs, Ba, Mo, and Fe, including mixtures of two or more thereof, more preferably from the group consisting of K, Ba, Mo, and Fe, including mixtures of two or more thereof, wherein more preferably M is Fe or Mo.

Further in the case where the one or more catalytic components comprised in each of the n reaction zones are independently from one another selected from the group consisting of Ni-containing catalysts, Fe-containing catalysts, Co-containing catalysts, Ru-containing catalysts, and mixtures thereof, it is preferred that the one or more Co-containing catalysts and/or the one or more Ni-containing catalysts further comprise one or more support materials onto which Co and/or Ni and/or M, preferably Co and M and/or Ni and M, are supported, wherein the support materials are preferably selected from the group consisting of $Al_2O_3$, $SiO_2$, $ZrO_2$, $CeO_2$, MgO, CaO, and mixtures of two or more thereof, more preferably from the group consisting of $Al_2O_3$, $SiO_2$, $ZrO_2$, $CeO_2$, and mixtures of two or more thereof, more preferably from the group consisting of $Al_2O_3$, $SiO_2$, and mixtures thereof, wherein more preferably the support materials comprise, preferably consist of, $Al_2O_3$.

In the case where the one or more Ni-containing catalysts comprise a further metal M selected from the group consisting of alkali metals, alkaline earth metals, Mo, and Fe, including mixtures of two or more thereof, it is preferred that the Ni-containing catalysts display a M:Ni atomic ratio in the range of from 0.1:99.9 to 70:30, more preferably of from 0.1:99.9 to 50:50, more preferably of from 0.1:99 to 40:60, more preferably of from 0.1:99.9 to 30:70, more preferably of from 0.5:99.5 to 30:70, more preferably of from 1:99 to 20:80, more preferably of from 3:97 to 10:90, and more preferably of from 5:95 to 6:94. In the case where M is Fe, it is particularly preferred that the Ni-containing catalysts display a Fe:Ni atomic ratio in the range of from 1:2 to 1:1, preferably in the range of from 1:1.65 to 1:1.20, more preferably in the range of from 1:1.45 to 1:1.40. In the case where M is Mo, it is preferred that the Ni-containing catalysts display a Mo:Ni atomic ratio in the range of from 1:1.50 to 1:0.50, more preferably in the range of from 1:1.20 to 1:0.80, more preferably in the range of from 1:1.10 to 1:0.90.

In the case where the one or more Co-containing catalysts comprise a further metal M selected from the group consisting of alkali metals, alkaline earth metals, Mo, and Fe, including mixtures of two or more thereof, it is preferred that the Co-containing catalysts display a M:Co atomic ratio in the range of from 0.1:99.9 to 70:30, more preferably of from 0.1:99.9 to 50:50, more preferably of from 0.1:99 to 40:60, more preferably of from 0.1:99.9 to 30:70, more preferably of from 0.5:99.5 to 30:70, more preferably of from 1:99 to 20:80, more preferably of from 3:97 to 10:90, and more preferably of from 5:95 to 6:94. In the case where M is Mo, it is preferred that the Co-containing catalysts display a Mo:Co atomic ratio in the range of from 1:1.50 to 1:0.50, more preferably in the range of from 1:1.20 to 1:0.80, more preferably in the range of from 1:1.10 to 1:0.90.

Further in the case where the one or more catalytic components comprised in each of the n reaction zones are independently from one another selected from the group consisting of Ni-containing catalysts, Fe-containing catalysts, Co-containing catalysts, Ru-containing catalysts, and mixtures thereof, it is preferred that the one or more Ni-containing catalysts and/or the one or more Co-containing catalysts further comprise Al and O.

In the case where the one or more Ni-containing catalysts and/or the one or more Co-containing catalysts further comprise Al and O, it is preferred that the one or more Ni-containing catalysts further comprise Mg, wherein the Ni:Mg:Al molar ratio is preferably in the range of from 1:(0.1-12):(0.5-20), more preferably of from 1:(0.5-8):(1-12), more preferably of from 1:(1-5):(3-8), more preferably of from 1:(1.5-3):(3.5-5), and more preferably of from 1:(2.0-2.4):(4.0-4.4).

Further in the case where the one or more Ni-containing catalysts and/or the one or more Co-containing catalysts further comprise Al and O, it is preferred that the one or more Ni-containing catalysts comprise Ni in an amount in the range of from 5 to 25 wt.-%, preferably in the range of from 10 to 20 wt.-%, more preferably in the range of from 14 to 17 wt.-%, more preferably in the range of from 15 to 16 wt.-%, based on 100 wt.-% of the total weight of the one or more Ni-containing catalyst.

Further in the case where the one or more Ni-containing catalysts and/or the one or more Co-containing catalysts further comprise Al and O, it is preferred that from 95 to 100 wt.-% of the one or more Ni-containing catalysts consists of Ni, Mg, $Al_2$, and O, more preferably from 97 to 100 wt.-%, more preferably from 98 to 100 wt.-%, more preferably from 99 to 100 wt.-%, more preferably from 99.5 to 100 wt.-%, and more preferably from 99.9 to 100 wt.-%.

Further in the case where the one or more Ni-containing catalysts and/or the one or more Co-containing catalysts further comprise Al and O, it is preferred that from 95 to 100 wt.-% of the one or more Ni-containing catalysts consists of Ni, M, Mg, Al, and O, preferably from 97 to 100 wt.-%, more preferably from 98 to 100 wt.-%, more preferably from 99 to 100 wt.-%, more preferably from 99.5 to 100 wt.-%, and more preferably from 99.9 to 100 wt.-%.

In the case where the one or more Co-containing catalysts further comprise Al and O, it is preferred that the one or more Co-containing catalysts further comprises La, wherein the Co:La:Al molar ratio is preferably in the range of from 1:(0.1-8):(1-50), more preferably of from 1:(0.5-5):(3-30), more preferably of from 1:(0.8-3):(5-20), more preferably of from 1:(1-2):(8-15), and more preferably of from 1:(1.3-1.7):(10-12).

In the case where the one or more Co-containing catalysts further comprises La, it is preferred according to a first alternative that from 95 to 100 wt.-% of the one or more Co-containing catalysts consists of Co, La, Al, and O, more preferably from 97 to 100 wt.-%, more preferably from 98 to 100 wt.-%, more preferably from 99 to 100 wt.-%, more preferably from 99.5 to 100 wt.-%, and more preferably from 99.9 to 100 wt.-%.

In the case where the one or more Co-containing catalysts further comprises La, it is preferred according to a second alternative that from 95 to 100 wt.-% of the one or more Co-containing catalysts consists of Co, M, La, Al, and O, preferably from 97 to 100 wt.-%, more preferably from 98 to 100 wt.-%, more preferably from 99 to 100 wt.-%, more preferably from 99.5 to 100 wt.-%, and more preferably from 99.9 to 100 wt.-%.

Further in the case where the one or more catalytic components comprised in each of the n reaction zones are independently from one another selected from the group consisting of Ni-containing catalysts, Fe-containing catalysts, Co-containing catalysts, Ru-containing catalysts, and mixtures thereof, it is preferred that the one or more Ru-containing catalysts further comprise one or more support materials onto which Ru is supported, wherein the support materials are preferably selected from the group consisting of metal oxides, wherein the metal of the metal oxides is preferably selected from the group consisting of Al, Si, Ti, Zr, Hf, V, Nb, Ta, Cr, Mo, W, Mn, alkaline earth metals, and rare earth metals, including combinations of two or more thereof, Al, Si, Ti, Zr, Mg, Ca, La, Ce, Pr, and Nd, including combinations of two or more thereof, Al, Ti, Zr, Mg, Ca, and La, including combinations of two or more thereof, Al, Zr, and Mg, including combinations of two or more thereof, wherein more preferably the one or more support materials comprise one or more metal oxides selected from the group consisting of $Al_2O_3$, $ZrO_2$, and spinels, including mixtures of two or more thereof, preferably from the group consisting of $ZrO_2$ and spinels, including mixtures of two or more thereof, wherein more preferably the one or more support materials comprise $ZrO_2$ and/or $MgAl_2O_4$, preferably $ZrO_2$, wherein more preferably the one or more support materials consist of $ZrO_2$ and/or $MgAl_2O_4$, preferably of $ZrO_2$.

In the case where the one or more Ru-containing catalysts further comprise one or more support materials onto which Ru is supported, it is preferred that the one or more support materials display a pore volume in the range of from 0.2 to 3 ml/g, preferably of from 0.4 to 1.5 ml/g, more preferably of from 0.6 to 1 ml/g, and more preferably of from 0.8 to 0.85 ml/g, wherein the pore volume is preferably determined according to ISO 15901-2:2022.

Further in the case where the one or more catalytic components comprised in each of the n reaction zones are independently from one another selected from the group consisting of Ni-containing catalysts, Fe-containing catalysts, Co-containing catalysts, Ru-containing catalysts, and mixtures thereof, it is preferred that the one or more Ru-containing catalysts display a BET surface area in the range of 20 to 800 $m^2/g$, more preferably of from 30 to 500 $m^2/g$, more preferably of from 40 to 300 $m^2/g$, more preferably of from 50 to 200 $m^2/g$, more preferably of from 60 to 100 $m^2/g$, and more preferably of from 70 to 75 $m^2/g$, wherein the BET surface area is preferably determined according to ISO 9277:2010.

Further in the case where the one or more catalytic components comprised in each of the n reaction zones are independently from one another selected from the group consisting of Ni-containing catalysts, Fe-containing catalysts, Co-containing catalysts, Ru-containing catalysts, and mixtures thereof, it is preferred that the one or more Ru-containing catalysts display a pore volume in the range of 0.1 to 2 ml/g, more preferably of from 0.15 to 1.2 ml/g, more preferably of from 0.2 to 0.8 ml/g, more preferably of from 0.25 to 0.5 ml/g, and more preferably of from 0.3 to 0.35 ml/g, wherein the pore volume is preferably determined according to ISO 15901-2:2022.

Further in the case where the one or more catalytic components comprised in each of the n reaction zones are independently from one another selected from the group consisting of Ni-containing catalysts, Fe-containing catalysts, Co-containing catalysts, Ru-containing catalysts, and mixtures thereof, it is preferred that the one or more Ru-containing catalysts comprises Ru in an amount in the range of from 0.5 to 15 wt.-% based on 100 wt.-% of the total amount of the one or more support materials, more preferably of from 1 to 10 wt.-%, more preferably of from 2 to 8 wt.-%, more preferably of from 3 to 6.5 wt.-%, more preferably of from 4 to 6 wt.-%, and more preferably of from 4.5 to 5.5 wt.-%.

Further in the case where the one or more catalytic components comprised in each of the n reaction zones are independently from one another selected from the group consisting of Ni-containing catalysts, Fe-containing catalysts, Co-containing catalysts, Ru-containing catalysts, and mixtures thereof, it is preferred that from 95 to 100 wt.-% of the one or more Ru-containing catalysts consists of Ru and the one or more support materials, more preferably from 97 to 100 wt.-%, more preferably from 98 to 100 wt.-%, more preferably from 99 to 100 wt.-%, more preferably from 99.5 to 100 wt.-%, and more preferably from 99.9 to 100 wt.-%.

Further in the case where the one or more catalytic components comprised in each of the n reaction zones are independently from one another selected from the group consisting of Ni-containing catalysts, Fe-containing catalysts, Co-containing catalysts, Ru-containing catalysts, and mixtures thereof, it is preferred that the one or more Ru-containing catalysts further comprises one or more alkali metal and/or alkaline earth metal hydroxides, wherein the one or more alkali metal and/or alkaline earth metal hydroxides are preferably supported on the one or more support materials supporting Ru, wherein the alkali metal and/or alkaline earth metal hydroxides are preferably selected from the group consisting of $Mg(OH)_2$, $Ca(OH)_2$, $Ba(OH)_2$, $Sr(OH)_2$, LiOH, NaOH, and KOH, including mixtures of two or more thereof, more preferably from the group consisting of $Mg(OH)_2$, $Ca(OH)_2$, LiOH, NaOH, and KOH, including mixtures of two or more thereof, more preferably from the group consisting of LiOH, NaOH, and KOH, including mixtures of two or more thereof, wherein more preferably the catalyst further comprises KOH and/or LiOH, preferably KOH.

In the case where the one or more Ru-containing catalysts further comprises one or more alkali metal hydroxides, it is preferred that the one or more Ru-containing catalysts comprises the one or more alkali metal hydroxides in an amount in the range of from 0.5 to 15 wt.-% based on 100 wt.-% of the total amount of the one or more support materials, more preferably of from 1 to 10 wt.-%, more preferably of from 2 to 8 wt.-%, more preferably of from 3 to 6.5 wt.-%, more preferably of from 4 to 6 wt.-%, and more preferably of from 4.5 to 5.5 wt.-%.

Further in the case where the one or more Ru-containing catalysts further comprises one or more alkali metal hydroxides, it is preferred that from 95 to 100 wt.-% of the one or more Ru-containing catalysts consists of Ru, the one or more alkali metal hydroxides, and the one or more support materials, more preferably from 97 to 100 wt.-%, more preferably from 98 to 100 wt.-%, more preferably from 99 to 100 wt.-%, more preferably from 99.5 to 100 wt.-%, and more preferably from 99.9 to 100 wt.-%.

It is preferred that the one or more catalytic components are in the form of moldings and/or in powder form, more preferably in the form of moldings, more preferably in the form of 3D printed moldings, extrudates, or tablets, and more preferably in the form of extrudates or tablets.

It is preferred that the one or more catalytic components are comprised in a fixed-bed.

It is preferred that the reactor is operated in downflow or upflow mode, preferably in downflow mode.

Further, the present invention relates to a production unit for the reforming of $NH_3$ to $N_2$ and $H_2$, the production unit comprising k adiabatic reactors each comprising a reactor inlet and a reactor outlet, wherein at least one of the reactors is a zoned reactor according to any one of the embodiments disclosed herein, wherein k is an integer in the range of from 1 to 6, wherein the reactors are arranged in sequence along the reaction stream, and wherein a heating component is arranged upstream of each of the k reactors.

It is preferred that one and the same heating unit is arranged upstream of each of the k reactors.

Alternatively, it is preferred that a separate heating unit is arranged upstream of each of the k reactors.

It is preferred that k is equal to or greater than 2, wherein k is more preferably an integer in the range of 3 to 6, more preferably in the range of 3 to 5, wherein k is more preferably 3 or 4.

It is preferred that the production unit comprises one or two zoned reactors according to any of the embodiments disclosed herein.

Yet further, the present invention relates to a process for the reforming of $NH_3$ to $N_2$ and $H_2$, the process comprising
(i) providing a zoned reactor according to any one of the embodiments disclosed herein,
(ii) providing a feed gas stream comprising $NH_3$;
(iii) feeding the feed gas stream provided in (ii) into the reactor according to any one of the embodiments disclosed herein provided in (i), wherein feeding is performed at a pressure of the feed gas stream in the range of from 1 to 80 bara, and at a temperature of the feed gas stream in the range of from 175 to 825° C.;
(iv) removing a product gas stream from the reactor or from the production unit provided in (i), the product gas stream comprising $N_2$ and $H_2$.

It is preferred that the feed gas stream provided in (ii) comprises from 1 to 100 vol.-% of $NH_3$, more preferably from 3 to 99.99 vol.-%, more preferably from 5 to 99.95 vol.-%, more preferably from 10 to 99.9 vol.-%, more preferably from 20 to 99.8 vol.-%, more preferably from 30 to 99.7 vol.-%, more preferably from 40 to 99.6 vol.-%, and more preferably from 50 to 99.5 vol.-%.

It is preferred that the feed gas stream provided in (ii) comprises from 0 to 50 vol.-% of $N_2$, more preferably from 0.01 to 30 vol.-%, more preferably from 0.03 to 15 vol.-%, more preferably from 0.05 to 5 vol.-%, more preferably from 0.1 to 1 vol.-%, more preferably from 0.12 to 0.5 vol.-%, and more preferably from 0.14 to 0.16 vol.-%.

It is preferred that the feed gas stream provided in (ii) comprises from 0 to 75 vol.-% of $H_2$, more preferably from 0 to 60 vol.-%, more preferably from 0 to 50 vol.-%, more preferably from 0 to 40 vol.-%, more preferably from 0 to 35 vol.-%, and more preferably from 0 to 30 vol.-%.

It is preferred that the feed gas stream provided in (ii) comprises from 100 to 50,000 ppmv of $H_2O$, more preferably from 200 to 30,000 ppmv, more preferably from 500 to 25,000 ppmv, more preferably from 1,000 to 20,000 ppmv, more preferably from 3,000 to 15,000 ppmv, more preferably from 5,000 to 10,000 ppmv.

It is preferred that the total amount of $NH_3$, $N_2$, and $H_2$ comprised in the feed gas stream provided in (ii) is in the range from 90 to 100 wt.-%, more preferably from 95 to 99.95 vol.-%, more preferably from 98 to 99.9 vol.-%, more preferably from 99 to 99.85 vol.-%, and more preferably from 99.7 to 99.8 vol.-%.

It is preferred that feeding in (iii) is performed at a temperature in the range of from 200 to 850° C., more preferably in the range of from 225 to 775° C., more preferably in the range of from 250 to 750° C.

It is preferred that feeding in (iii) is performed at a pressure in the range of from 2 to 80 bara, more preferably in the range of from 4 to 50 bara, more preferably in the range of from 5 to 20 bara.

It is preferred that the feed gas stream is fed into the reactor according to any one of the embodiments disclosed herein at a gas hourly space velocity in the range of from 2000 to 16000 h$^{-1}$, more preferably in the range of from 2500 to 9500 h$^{-1}$, more preferably in the range of from 3000 to 6000 h$^{-1}$.

It is preferred that the reactor provided in (i) is operated in downflow or upflow mode, more preferably in downflow mode.

Yet further, the present invention relates to a use of a reactor according to any one of the embodiments disclosed herein or of the production unit according to any one of the embodiments disclosed herein, for the reforming of $NH_3$ to $N_2$ and $H_2$.

The present invention is further illustrated by the following set of embodiments and combinations of embodiments resulting from the dependencies and back-references as indicated. In particular, it is noted that in each instance where a range of embodiments is mentioned, for example in the context of a term such as "The reactor of any one of embodiments 1 to 4", every embodiment in this range is meant to be explicitly disclosed for the skilled person, i.e. the wording of this term is to be understood by the skilled person as being synonymous to "The reactor of any one of embodiments 1, 2, 3, and 4". Further, it is explicitly noted that the following set of embodiments is not the set of claims determining the extent of protection, but represents a suitably structured part of the description directed to general and preferred aspects of the present invention.

1. A zoned reactor for the reforming of $NH_3$ to $N_2$ and $H_2$, wherein the reactor is an adiabatic rector, and wherein the reactor comprises
    a reactor inlet and a reactor outlet, the reactor inlet and the reactor outlet being separated by the axial length L of the reactor, and
    n reaction zones arranged in sequence and extending from the reactor inlet to the reactor outlet along the axial length L of the reactor, wherein n is an integer in the range of from 2 to 5,
    wherein the length of each of the n reaction zones in axial direction constitutes a fraction of the length L of the reactor, wherein the sum of the lengths of all of the reaction zones in axial direction is less than or equal to L,
    wherein independently from one another, each of the n reaction zones comprises one or more catalytic components,
    wherein the inlet reaction zone which is adjacent to the reactor inlet displays a higher light-off temperature T50 in the reforming of $NH_3$ to $N_2$ and $H_2$ than each of the one or more subsequent reaction zones downstream thereof,
    wherein the outlet reaction zone which is adjacent to the reactor outlet displays a lower light-off temperature T50 in the reforming of $NH_3$ to $N_2$ and $H_2$ than each of the one or more preceding reaction zones upstream thereof, and
    wherein each of the optional intermediate reaction zones between the inlet and outlet reaction zones respectively displays a light-off temperature T50 in the reforming of $NH_3$ to $N_2$ and $H_2$ which is lower than each of the one or more preceding reaction zones upstream thereof and which is higher than each of the one or more subsequent reaction zones downstream thereof, wherein the T50 light-off temperature is preferably determined according to Reference Example 1.

2. The reactor of embodiment 1, wherein the inlet reaction zone displays a T50 light-off temperature higher than 450° C., preferably in the range of from higher than 450 to 850° C., more preferably in the range of from 470 to 650° C., more preferably in the range of from 490 to 570° C., more preferably in the range of from 510 to 540° C., more preferably in the range of from 520 to 530° C., wherein the T50 light-off temperature is preferably determined according to Reference Example 1.

3. The reactor of embodiment 1 or 2, wherein the outlet reaction zone displays a T50 light-off temperature equal to or lower than 450° C., preferably in the range of from 200 to equal or lower than 450° C., more preferably in the range of from 300 to 430° C., more preferably in the range of from 340 to 410° C., more preferably in the range of from 360 to 390° C., more preferably in the range of from 370 to 380° C., wherein the T50 light-off temperature is preferably determined according to Reference Example 1.

4. The reactor of any one of embodiments 1 to 3, wherein the axial length L of the reactor is in the range of from 0.1 to 20 m, preferably in the range of from 0.5 to 10 m, more preferably in the range of from 1.0 to 5.0 m, more preferably in the range of from 1.5 to 2.5 m, more preferably in the range of from 1.89 to 1.93 m.

5. The reactor of any one of embodiments 1 to 4, wherein the cross-section of the reactor is circular.

6. The reactor of embodiment 5, wherein the reactor geometry is cylindrical, and wherein the reactor has a diameter D, wherein D is in the range of from 0.1 to 20 m, preferably in the range of from 0.5 to 10 m, more preferably in the range of from 1.0 to 5.0 m, more preferably in the range of from 1.5 to 2.5 m, more preferably in the range of from 1.89 to 1.93 m.

7. The reactor of embodiment 6, wherein the reactor displays an aspect ratio L:D of the axial length L of the reactor to the diameter D of the reactor in the range of from 0.01:1 to 1:0.01, preferably in the range of from 0.05:1 to 1:0.05, more preferably in the range of from 0.1:1 to 1:0.1, more preferably in the range of from 0.3:1 to 1:0.3, more preferably in the range of from 0.5:1 to 1:0.5, more preferably in the range of from 0.8:1 to 1:0.8, more preferably in the range of from 0.9:1 to 1:0.9, wherein the aspect ratio L:D more preferably is 1:1.

8. The reactor of any one of embodiments 1 to 7, wherein n is an integer in the range of from 2 to 5, preferably in the range of from 2 to 4, wherein more preferably n is 2 or 3, wherein the reactor more preferably comprises 2 reaction zones.

9. The reactor of any one of embodiments 1 to 8, wherein each of the reaction zones independently from one another has a length in the range of from $(0.01 \cdot L/n)$ to $(1.99 \cdot L/n)$, preferably in the range of from $(0.05 \cdot L/n)$ to $(1.95 \cdot L/n)$, more preferably in the range of from $(0.1 \cdot L/n)$ to $(1.9 \cdot L/n)$, more preferably in the range of from $(0.2 \cdot L/n)$ to $(1.8 \cdot L/n)$, more preferably in the range of from $(0.5 \cdot L/n)$ to $(1.5 \cdot L/n)$, more preferably in the range of from $(0.9-L/n)$ to $(1.1 \cdot L/n)$, more preferably in the range of from $(0.95 \cdot L)/n$ to $(1.05 \cdot L)/n$, more preferably in the range of from $(0.99 \cdot L)/n$ to $(1.01 \cdot L)/n$, wherein each of the reaction zones more preferably has a length of $L/n$.

10. The reactor of any one of embodiments 1 to 9, wherein the one or more catalytic components comprised in each of the n reaction zones are independently from one another selected from the group consisting of Ni-containing catalysts, Fe-containing catalysts, Co-containing catalysts, Ru-containing catalysts, and mixtures thereof, preferably from the group consisting of Ni-containing catalysts, Ru-containing catalysts, and mixtures thereof.

11. The reactor of any one of embodiments 1 to 10, wherein the one or more catalytic components comprised in the inlet reaction zone are selected from the group consisting of Ni-containing catalysts, Fe-containing catalysts, Co-containing catalysts, Ru-containing catalysts, and mixtures thereof, preferably from the group consisting of Ni-containing catalysts, Ru-containing catalysts, and mixtures thereof, wherein the one or more catalytic components comprised in the inlet reaction zone are preferably one or more Ni-containing catalysts.

12. The reactor of any one of embodiments 1 to 11, wherein the one or more catalytic components comprised in the outlet reaction zone are selected from the group consisting of Ni-containing catalysts, Fe-containing catalysts, Co-containing catalysts, Ru-containing catalysts, and mixtures thereof, preferably from the group consisting of Ni-containing catalysts, Ru-containing catalysts, and mixtures thereof, wherein the one or more catalytic components comprised in the outlet reaction zone are preferably one or more Ru-containing catalysts.

13. The reactor of any one of embodiments 1 to 12, wherein the one or more catalytic components comprised in each of the optional intermediate reaction zones between the inlet and outlet reaction zones are independently from one another selected from the group consisting of Ni-containing catalysts, Fe-containing catalysts, Co-containing catalysts, Ru-containing catalysts, and mixtures thereof, wherein the one or more catalytic components comprised in each of the optional intermediate reaction zones between the inlet and outlet reaction zones preferably comprise independently from one another one or more catalytic components selected from the group consisting of Ni-containing catalysts, Co-containing catalysts, Ru-containing catalysts, and mixtures of two or more thereof.

14. The reactor of any one of embodiments 10 to 13, wherein the one or more Co-containing catalysts and/or the one or more Ni-containing catalysts comprise a further metal M selected from the group consisting of alkali metals, alkaline earth metals, Mo, and Fe, including mixtures of two or more thereof, preferably from the group consisting of Li, K, Na, Cs, Mg, Ca, Sr, Ba, Mo, and Fe, including mixtures of two or more thereof, more preferably from the group consisting of K, Na, Cs, Ba, Mo, and Fe, including mixtures of two or more thereof, more preferably from the group consisting of K, Ba, Mo, and Fe, including mixtures of two or more thereof, wherein more preferably M is Fe or Mo.

15. The reactor of any one of embodiments 10 to 14, wherein the one or more Co-containing catalysts and/or the one or more Ni-containing catalysts further comprise one or more support materials onto which Co and/or Ni and/or M, preferably Co and M and/or Ni and M, are supported, wherein the support materials are preferably selected from the group consisting of $Al_2O_3$, $SiO_2$, $ZrO_2$, $CeO_2$, MgO, CaO, and mixtures of two or more thereof, more preferably from the group consisting of $Al_2O_3$, $SiO_2$, $ZrO_2$, $CeO_2$, and mixtures of two or more thereof, more preferably from the group consisting of $Al_2O_3$, $SiO_2$, and mixtures thereof, wherein more preferably the support materials comprise, preferably consist of, $Al_2O_3$.

16. The reactor of embodiment 14 or 15, wherein the Ni-containing catalysts display a M:Ni atomic ratio in the range of from 0.1:99.9 to 70:30, preferably of from 0.1:99.9 to 50:50, more preferably of from 0.1:99 to 40:60, more preferably of from 0.1:99.9 to 30:70, more preferably of from 0.5:99.5 to 30:70, more preferably of from 1:99 to 20:80, more preferably of from 3:97 to 10:90, and more preferably of from 5:95 to 6:94.

17. The reactor of embodiment 16, wherein M is Fe, and wherein the Ni-containing catalysts display a Fe:Ni atomic ratio in the range of from 1:2 to 1:1, preferably in the range of from 1:1.65 to 1:1.20, more preferably in the range of from 1:1.45 to 1:1.40.

18. The reactor of embodiment 16, wherein M is Mo, and wherein the Ni-containing catalysts display a Mo:Ni atomic ratio in the range of from 1:1.50 to 1:0.50, preferably in the range of from 1:1.20 to 1:0.80, more preferably in the range of from 1:1.10 to 1:0.90.

19. The reactor of embodiment 14 or 15, wherein the Co-containing catalysts display a M:Co atomic ratio in the range of from 0.1:99.9 to 70:30, preferably of from 0.1:99.9 to 50:50, more preferably of from 0.1:99 to 40:60, more preferably of from 0.1:99.9 to 30:70, more preferably of from 0.5:99.5 to 30:70, more preferably of from 1:99 to 20:80, more preferably of from 3:97 to 10:90, and more preferably of from 5:95 to 6:94.

20. The reactor of embodiment 19, wherein M is Mo, and wherein the Co-containing catalysts display a Mo:Co atomic ratio in the range of from 1:1.50 to 1:0.50, preferably in the range of from 1:1.20 to 1:0.80, more preferably in the range of from 1:1.10 to 1:0.90.

21. The reactor of any one of embodiments 10 to 20, wherein the one or more Ni-containing catalysts and/or the one or more Co-containing catalysts further comprise Al and O.

22. The reactor of embodiment 21, wherein the one or more Ni-containing catalysts further comprise Mg, wherein the Ni:Mg:Al molar ratio is preferably in the range of from 1:(0.1 12):(0.5-20), more preferably of from 1:(0.5-8):(1-12), more preferably of from 1:(1-5):(3-8), more preferably of from 1:(1.5-3):(3.5-5), and more preferably of from 1:(2.0-2.4):(4.0-4.4).

23. The reactor of embodiment 21 or 22, wherein the one or more Ni-containing catalysts comprise Ni in an amount in the range of from 5 to 25 wt.-%, preferably in the range of from 10 to 20 wt.-%, more preferably in the range of 14 to 17 wt.-%, more preferably in the range of 15 to 16 wt.-%, based on 100 wt.-% of the total weight of the one or more Ni-containing catalyst.

24. The reactor of any one of embodiments 21 to 23, wherein from 95 to 100 wt.-% of the one or more Ni-containing catalysts consists of Ni, Mg, Al, and O, preferably from 97 to 100 wt.-%, more preferably from 98 to 100 wt.-%, more preferably from 99 to 100 wt.-%, more preferably from 99.5 to 100 wt.-%, and more preferably from 99.9 to 100 wt.-%.

25. The reactor of any one of embodiments 21 to 24, wherein from 95 to 100 wt.-% of the one or more Ni-containing catalysts consists of Ni, M, Mg, Al, and O, preferably from 97 to 100 wt.-%, more preferably from 98 to 100 wt.-%, more preferably from 99 to 100 wt.-%, more preferably from 99.5 to 100 wt.-%, and more preferably from 99.9 to 100 wt.-%.

26. The process of embodiment 21, wherein the one or more Co-containing catalysts further comprises La, wherein the Co:La:Al molar ratio is preferably in the range of from 1:(0.1-8):(1-50), more preferably of from 1:(0.5-5):(3-30), more preferably of from 1:(0.8-3):(5- 20), more preferably of from 1:(1-2):(8-15), and more preferably of from 1:(1.3-1.7):(10-12).

27. The process of embodiment 26, wherein from 95 to 100 wt.-% of the one or more Co-containing catalysts consists of Co, La, Al, and O, preferably from 97 to 100 wt.-%, more preferably from 98 to 100 wt.-%, more preferably from 99 to 100 wt.-%, more preferably from 99.5 to 100 wt.-%, and more preferably from 99.9 to 100 wt.-%.

28. The process of embodiment 26, wherein from 95 to 100 wt.-% of the one or more Co-containing catalysts consists of Co, M, La, Al, and O, preferably from 97 to 100 wt.-%, more preferably from 98 to 100 wt.-%, more preferably from 99 to 100 wt.-%, more preferably from 99.5 to 100 wt.-%, and more preferably from 99.9 to 100 wt.-%.

29. The reactor of any one of embodiments 10 to 28, wherein the one or more Ru-containing catalysts further comprise one or more support materials onto which Ru is supported, wherein the support materials are preferably selected from the group consisting of metal oxides, wherein the metal of the metal oxides is preferably selected from the group consisting of Al, Si, Ti, Zr, Hf, V, Nb, Ta, Cr, Mo, W, Mn, alkaline earth metals, and rare earth metals, including combinations of two or more thereof, Al, Si, Ti, Zr, Mg, Ca, La, Ce, Pr, and Nd, including combinations of two or more thereof, Al, Ti, Zr, Mg, Ca, and La, including combinations of two or more thereof, Al, Zr, and Mg, including combinations of two or more thereof, wherein more preferably the one or more support materials comprise one or more metal oxides selected from the group consisting of $Al_2O_3$, $ZrO_2$, and spinels, including mixtures of two or more thereof, preferably from the group consisting of $ZrO_2$ and spinels, including mixtures of two or more thereof, wherein more preferably the one or more support materials comprise $ZrO_2$ and/or $MgAl_2O_4$, preferably $ZrO_2$, wherein more preferably the one or more support materials consist of $ZrO_2$ and/or $MgAl_2O_4$, preferably of $ZrO_2$.

30. The reactor of embodiment 29, wherein the one or more support materials display a pore volume in the range of from 0.2 to 3 ml/g, preferably of from 0.4 to 1.5 ml/g, more preferably of from 0.6 to 1 ml/g, and more preferably of from 0.8 to 0.85 ml/g, wherein the pore volume is preferably determined according to ISO 15901-2:2022.

31. The reactor of any one of embodiments 10 to 30, wherein the one or more Ru-containing catalysts display a BET surface area in the range of 20 to 800 $m^2/g$, preferably of from 30 to 500 $m^2/g$, more preferably of from 40 to 300 $m^2/g$, more preferably of from 50 to 200 $m^2/g$, more preferably of from 60 to 100 $m^2/g$, and more preferably of from 70 to 75 $m^2/g$, wherein the BET surface area is preferably determined according to ISO 9277:2010.

32. The reactor of any one of embodiments 10 to 31, wherein the one or more Ru-containing catalysts display a pore volume in the range of 0.1 to 2 ml/g, preferably of from 0.15 to 1.2 ml/g, more preferably of from 0.2 to 0.8 ml/g, more preferably of from 0.25 to 0.5 ml/g, and more preferably of from 0.3 to 0.35 ml/g, wherein the pore volume is preferably determined according to ISO 15901-2:2022.

33. The reactor of any one of embodiments 10 to 32, wherein the one or more Ru-containing catalysts comprises Ru in an amount in the range of from 0.5 to 15 wt.-% based on 100 wt.-% of the total amount of the one or more support materials, preferably of from 1 to 10 wt.-%, more preferably of from 2 to 8 wt.-%, more preferably of from 3 to 6.5 wt.-%, more preferably of from 4 to 6 wt.-%, and more preferably of from 4.5 to 5.5 wt.-%.

34. The reactor of any one of embodiments 10 to 33, wherein from 95 to 100 wt.-% of the one or more Ru-containing catalysts consists of Ru and the one or more support materials, preferably from 97 to 100 wt.-%, more preferably from 98 to 100 wt.-%, more preferably from 99 to 100 wt.-%, more preferably from 99.5 to 100 wt.-%, and more preferably from 99.9 to 100 wt.-%.

35. The reactor of any one of embodiments 10 to 34, wherein the one or more Ru-containing catalysts further comprises one or more alkali metal and/or alkaline earth metal hydroxides, wherein the one or more alkali metal and/or alkaline earth metal hydroxides are preferably supported on the one or more support materials supporting Ru, wherein the alkali metal and/or alkaline earth metal hydroxides are preferably selected from the group consisting of $Mg(OH)_2$, $Ca(OH)_2$, $Ba(OH)_2$, $Sr(OH)_2$, LiOH, NaOH, and KOH, including mixtures of two or more thereof, more preferably from the group consisting of $Mg(OH)_2$, $Ca(OH)_2$, LiOH, NaOH, and KOH, including mixtures of two or more thereof, more preferably from the group consisting of LiOH, NaOH, and KOH, including mixtures of two or more thereof, wherein more preferably the catalyst further comprises KOH and/or LiOH, preferably KOH.

36. The reactor of embodiment 35, wherein the one or more Ru-containing catalysts comprises the one or more alkali metal hydroxides in an amount in the range of from 0.5 to 15 wt.-% based on 100 wt.-% of the total amount of the one or more support materials, preferably of from 1 to 10 wt.-%, more preferably of from 2 to 8 wt.-%, more preferably of from 3 to 6.5 wt.-%, more preferably of from 4 to 6 wt.-%, and more preferably of from 4.5 to 5.5 wt.-%.

37. The reactor of embodiment 35 or 36, wherein from 95 to 100 wt.-% of the one or more Ru-containing catalysts consists of Ru, the one or more alkali metal hydroxides, and the one or more support materials, preferably from 97 to 100 wt.-%, more preferably from 98 to 100 wt.-%, more preferably from 99 to 100 wt.-%, more preferably from 99.5 to 100 wt.-%, and more preferably from 99.9 to 100 wt.-%.

38. The reactor of any one of embodiments 1 to 37, wherein the one or more catalytic components are in the form of moldings and/or in powder form, preferably in the form of moldings, more preferably in the form of 3D printed moldings, extrudates, or tablets, and more preferably in the form of extrudates or tablets.

39. The reactor of any one of embodiments 1 to 38, wherein the one or more catalytic components are comprised in a fixed-bed.

40. The reactor of any one of embodiments 1 to 39, wherein the reactor is operated in downflow or upflow mode, preferably in downflow mode.

41. A production unit for the reforming of $NH_3$ to $N_2$ and $H_2$, the production unit comprising k adiabatic reactors each comprising a reactor inlet and a reactor outlet, wherein at least one of the reactors is a zoned reactor according to any one of embodiments 1 to 40, wherein k is an integer in the range of from 1 to 6, wherein the reactors are arranged in sequence along the reaction stream, and wherein a heating component is arranged upstream of each of the k reactors.

42. The production unit of embodiment 41, wherein one and the same heating unit is arranged upstream of each of the k reactors.

43. The production unit of embodiment 41, wherein a separate heating unit is arranged upstream of each of the k reactors.

44. The production unit of any one of embodiments 41 to 43, wherein k is equal to or greater than 2, wherein k is preferably an integer in the range of 3 to 6, preferably in the range of 3 to 5, wherein k is more preferably 3 or 4.

45. The production unit of any one of embodiments 41 to 44, wherein the production unit comprises one or two zoned reactors according to any of embodiments 1 to 40.

46. A process for the reforming of $NH_3$ to $N_2$ and $H_2$, the process comprising
    (i) providing a zoned reactor according to any one of embodiments 1 to 40,
    (ii) providing a feed gas stream comprising $NH_3$;
    (iii) feeding the feed gas stream provided in (ii) into the reactor according to any one of embodiments 1 to 40 provided in (i), wherein feeding is performed at a pressure of the feed gas stream in the range of from 1 to 80 bara, and at a temperature of the feed gas stream in the range of from 175 to 825° C.;
    (iv) removing a product gas stream from the reactor or from the production unit provided in (i), the product gas stream comprising $N_2$ and $H_2$.

47. The process of embodiment 46, wherein the feed gas stream provided in (ii) comprises from 1 to 100 vol.-% of $NH_3$, preferably from 3 to 99.99 vol.-%, more preferably from 5 to 99.95 vol.-%, more preferably from 10 to 99.9 vol.-%, more preferably from 20 to 99.8 vol.-%, more preferably from 30 to 99.7 vol.-%, more preferably from 40 to 99.6 vol.-%, and more preferably from 50 to 99.5 vol.-%.

48. The process of embodiment 46 or 47, wherein the feed gas stream provided in (ii) comprises from 0 to 50 vol.-% of $N_2$, preferably from 0.01 to 30 vol.-%, more preferably from 0.03 to 15 vol.-%, more preferably from 0.05 to 5 vol.-%, more preferably from 0.1 to 1 vol.-%, more preferably from 0.12 to 0.5 vol.-%, and more preferably from 0.14 to 0.16 vol.-%.

49. The process of any one of embodiments 46 to 48, wherein the feed gas stream provided in (ii) comprises from 0 to 75 vol.-% of $H_2$, preferably from 0 to 60 vol.-%, more preferably from 0 to 50 vol.-%, more preferably from 0 to 40 vol.-%, more preferably from 0 to 35 vol.-%, and more preferably from 0 to 30 vol.-%.

50. The process of any one of embodiments 46 to 49, wherein the feed gas stream provided in (ii) comprises from 100 to 50,000 ppmv of $H_2O$, preferably from 200 to 30,000 ppmv, more preferably from 500 to 25,000 ppmv, more preferably from 1,000 to 20,000 ppmv, more preferably from 3,000 to 15,000 ppmv, more preferably from 5,000 to 10,000 ppmv.

51. The process of any one of embodiments 46 to 50, wherein the total amount of $NH_3$, $N_2$, and $H_2$ comprised in the feed gas stream provided in (ii) is in the range from 90 to 100 wt.-%, preferably from 95 to 99.95 vol.-%, more preferably from 98 to 99.9 vol.-%, more preferably from 99 to 99.85 vol.-%, and more preferably from 99.7 to 99.8 vol.-%.

52. The process of any one of embodiments 46 to 51, wherein feeding in (iii) is performed at a temperature in the range of from 200 to 850° C., preferably in the range of from 225 to 775° C., more preferably in the range of from 250 to 750° C.
53. The process of any one of embodiments 46 to 52, wherein feeding in (iii) is performed at a pressure in the range of from 2 to 80 bara, preferably in the range of from 4 to 50 bara, more preferably in the range of from 5 to 20 bara.
54. The process of any one of embodiments 46 to 53, wherein the feed gas stream is fed into the reactor according to any one of embodiments 1 to 40 at a gas hourly space velocity in the range of from 2000 to 16000 $h^{-1}$, preferably in the range of from 2500 to 9500 $h^{-1}$, more preferably in the range of from 3000 to 6000 $h^{-1}$.
55. The process of any one of embodiments 46 to 54, wherein the reactor provided in (i) is operated in downflow or upflow mode, preferably in downflow mode.
56. Use of a reactor according to any one of embodiments 1 to 40 or of the production unit according to any one of embodiments 41 to 45, for the reforming of $NH_3$ to $N_2$ and $H_2$.

The present invention is illustrated by the following examples, reference examples, and comparative examples.

EXAMPLES

Reference Example 1: Determination of the T50 Light-Off Temperature in the Reforming of $NH_3$ to $N_2$ and $H_2$ Prior to the catalytic testing, the catalyst samples were placed into a reactor and activated in a reducing atmosphere of 5 vol.-% $H_2$ in Ar at a temperature of 350° C. (dwell time 1 h, heating rate 2° C./min). After activating the catalyst, a feed stream containing ammonia (94.5 vol.-% $NH_3$, 0.5 vol. % $H_2O$, 5 vol. % of Ar) was fed into the reactor, wherein the partial pressure of $NH_3$ (p($NH_3$)) was set to 30 bara. The gas hourly space velocity (GHSV) with respect to the $NH_3$ content was set to 4000 $h^{-1}$. The temperature of the feed stream was varied from 350 to 650° C. At each point of measurement, the temperature was held constant and the conversion rate was determined in the steady-state (conversion rate variation of ±1% or less).

Reference Example 2: Simulation of Catalytic Activity

A kinetic model for the Ni-containing catalyst according to Reference Example 3 and for the Ru-containing catalyst according to Reference Example 4 was developed using the MATLAB soft-ware (version R2021b).

FIG. 3 shows the parity plots of the simulated and experimental values for the Ni-containing catalyst (FIG. 3A) and for the Ru-containing catalyst (FIG. 3B). A very good agreement was found. Thus, the estimated kinetic parameters implemented in the assumed model were found to be highly valid.

Based on the kinetic model, $NH_3$-reforming processes were simulated based on a cascade of adiabatic reactors within defined scenarios.

As scenario, a gas hourly space velocity of 3000 $h^{-1}$ (unless otherwise indicated) was set for the first reactor in the direction of the $NH_3$ feed stream. As reactors, adiabatic reactors were used, wherein the reactors were serially arranged, thus, as a cascade. Further, the volume of each reactor was defined by a length of 1.9113 m and a diameter of 1.9113 m. Thus, the aspect ratio of each reactor was 1:1. Due to the volume increase as function of the reforming of $NH_3$, the gas hourly space velocity is also increasing when comparing the GHSV at the reactor inlet of a reactor with that at the reactor outlet of said reactor. Further, the simulations were conducted at a pressure of 5 and 20 bara.

Thus, the reforming of $NH_3$ was simulated for the production units according to Comparative Examples 1-2 and Examples 3-5, also with varying the temperature, the pressure, and the gas hourly space velocity. The numbering of the reactors indicates the direction of the gas stream from reactor 1 to reactor n.

Reference Example 3: Provision of a Ni-Containing Catalyst

The Ni-containing catalyst was provided following the process described in example E1 of WO 2013/068905 A1.

However, an aqueous solution of Nickel nitrate (14% Ni concentration) was used instead of the pulverulent nickel nitrate hexahydrate. The various ingredients were mixed to a paste which was extruded. The extrudates were crushed and sieved to a target fraction having a particle size of from 200 to 900 µm after drying and low temperature calcination.

The sieved powder was then mixed with 2.8 weight-% graphite (Asbury Graphite 3160) and 5.5 weight-% cellulose (Arbocel BWW 40). The resulting mixture was tableted to moldings having a four-hole cross-section as shown in FIG. 1 of WO 2020/157202 A. For calcination, the moldings were heated in an annealing furnace to a temperature of 1,030 to 1,050° C. which was held for 4 hours.

The nickel content of the calcined moldings was 15.5 weight-%, the magnesium content 14.0 weight-%, and the aluminium content was 29.5 weight-%.

As shown in FIG. 2, the T50 light-off temperature determined according to Reference Example 1 of the Ni-containing catalyst of Example 1 was 525° C.

Reference Example 4: Provision of a Ru-Containing Catalyst

Ru supported on $ZrO_2$ was provided according to Example 8 of WO 2015/086639 A2 by impregnation of a ruthenium salt solution onto a zirconium oxide powder (D9-89, BASF, BET surface area: 78 $m^2$/g, pore volume: 0.84 ml/g), for obtaining Ru supported on $ZrO_2$ at a loading of 5 weight-%. The catalyst was then extruded to form extrudates having a diameter of 3 mm.

A 5 g sample of the obtained 5 weight-% Ru on $ZrO_2$ extrudates was subject to impregnation with a KOH solution. To this effect, 5 g of the obtained extrudates were split to form fractions in the range of 315 to 500 microns, which were then impregnated via incipient wetness impregnation with 0.25 g of KOH dissolved in 1.65 ml of water. The sample was then dried at 120° C. and subsequently calcined under inert atmosphere at 500° C. for 2 hours.

As shown in FIG. 2, the T50 light-off temperature determined according to Reference Example 1 of the Ru-containing catalyst of Example 1 was 375° C.

Comparative Example 1: Production Unit Containing Four Non-Zoned Reactors

1.1 Assembly of Production Unit

A production unit comprising four reactors was provided, wherein each reactor was filled with the Ni-containing catalyst according to Reference Example 3.

1.2 Simulation of Catalytic Activity

According to Reference Example 2, the reforming of $NH_3$ was simulated for said adiabatic reactor cascade at a pressure of 5 bara and an initial GHSV of 3000 $h^{-1}$ for the first reactor (1.2.1), and at a pressure of 20 bara and an initial GHSV of 3000 $h^{-1}$ for the first reactor (1.2.2). The initial temperature was set to 750° C. for each reactor in both simulations. The results for the simulated reforming of $NH_3$ are shown in FIGS. 4-5 and Tables 1-2 below, respectively.

1.2.1 Simulation at a Pressure of 5 Bara

Table 1

Temperatures of the inlet and outlet streams at 5 bara and the $NH_3$ conversion values of the four reactors filled with Ni-containing catalyst.

|  | Temp. inlet [° C.] | Temp. outlet [° C.] | Conversion [%] | GHSV [1/h] |
|---|---|---|---|---|
| Reactor 1 | 750 | 461.1 | 28.6 | 3000 |
| Reactor 2 | 750 | 505.0 | 53.9 | 3859 |
| Reactor 3 | 750 | 539.1 | 76.3 | 4617 |
| Reactor 4 | 750 | 581.5 | 94.7 | 5290 |

As can be gathered from the results shown in Table 1, a maximum conversion of 94.7% of $NH_3$ is possible with the four reactors filled with the Ni-containing catalyst.

1.2.2 Simulation at a Pressure of 20 Bara

Table 2

Temperatures of the inlet and outlet streams at 20 bara and the $NH_3$ conversion values of the four reactors filled with Ni-containing catalyst.

|  | Temp. inlet [° C.] | Temp. outlet [° C.] | Conversion [%] | GHSV [1/h] |
|---|---|---|---|---|
| Reactor 1 | 750 | 481.7 | 26.6 | 3000 |
| Reactor 2 | 750 | 526.3 | 49.7 | 3800 |
| Reactor 3 | 750 | 557.8 | 70.0 | 4490 |
| Reactor 4 | 750 | 590.0 | 87.3 | 5100 |

As can be gathered from the results shown in Table 2, a maximum conversion of 87.3% of $NH_3$ is possible with the four reactors filled with the Ni-containing catalyst. When comparing the results shown in FIGS. 4 and 5, it can be seen that at a higher pressure the possible equilibrium conversion was shifted to lower values, and that also the conversions decreased. In particular, the $NH_3$ conversion after the fourth reactor was determined with 87.3% at 20 bara to be lower than for the reforming at 5 bara, where a conversion of 94.7% was determined.

Comparative Example 2: Production Unit Containing Four Non-Zoned Reactors

2.1 Assembly of Production Unit

A production unit comprising four reactors was provided, wherein each reactor was filled with the Ru-containing catalyst according to Reference Example 4.

2.2 Simulation of Catalytic Activity

According to Reference Example 2, the reforming of $NH_3$ was simulated for said adiabatic reactor cascade at a pressure of 5 bara and an initial GHSV of 3000 $h^{-1}$ for the first reactor. The initial temperature was set to 600° C. for each reactor in the simulations. The results for the simulated reforming of $NH_3$ are shown in FIG. 6 and Table 3 below.

Table 3

Temperatures of the inlet and outlet streams at 5 bara and the $NH_3$ conversion values of the four reactors filled with Ru-containing catalyst.

|  | Temp. inlet [° C.] | Temp. outlet [° C.] | Conversion [%] | GHSV [1/h] |
|---|---|---|---|---|
| Reactor 1 | 600 | 252.7 | 32.9 | 3000 |
| Reactor 2 | 600 | 282.7 | 65.2 | 3987 |
| Reactor 3 | 600 | 348.6 | 92.2 | 4955 |
| Reactor 4 | 600 | 536.6 | 99.2 | 5766 |

As can be gathered from the results shown in Table 3, a maximum conversion of 99.2% of $NH_3$ is possible with the four reactors filled with the Ru-containing catalyst. Further, it can be seen from FIG. 6 that the third reactor reaches equilibrium conversion of 92.2% at 348.6° C.

Generally, the Ru-containing catalyst showed a higher conversion of $NH_3$ per reactor than the Ni-containing catalyst, but the reaction temperatures were also shifted to lower temperatures by 150° C., in particular from 750° C. to 600° C. for the inlet temperature.

Example 3: Production Unit Containing One Zoned Reactor and Three Non-Zoned Reactors

3.1 Assembly of Production Unit

A production unit comprising four reactors was provided. The third reactor in the direction of the $NH_3$ feed stream was filled in the upstream reaction zone with the Ni-containing catalyst according to Reference Example 3 and in the downstream reaction zone with the Ru-containing catalyst according to Reference Example 4 to give a zoned reactor. The volume ratio of the reaction zone comprising the Ni-containing catalyst to the reaction zone comprising the Ru-containing catalyst was 1:1. The other reactors were filled with the Ni-containing catalyst according to Reference Example 3.

3.2 Simulation of Catalytic Activity

According to Reference Example 2, the reforming of $NH_3$ was simulated for said adiabatic reactor cascade at a pressure of 5 bara and an initial GHSV of 3000 $h^{-1}$ for the first reactor (3.2.1), at a pressure of 20 bara and an initial GHSV of 3000 $h^{-1}$ for the first reactor (3.2.2), and at a pressure of 20 bara and an initial GHSV of 9000 $h^{-1}$ for the first reactor (3.2.3). The initial temperature was set to 750° C. for each reactor in all three simulations. The results for the simulated reforming of $NH_3$ are shown in FIGS. 7-9 and Tables 4-6 below, respectively.

3.2.1 Simulation at a Pressure of 5 Bara, and Initial GHSV of 3000 $h^{-1}$ for the First Reactor Table 4

Temperatures of the inlet and outlet streams at 5 bara and the $NH_3$ conversion values of the four reactors, wherein the third reactor was zoned. The upstream reaction zone of the third reactor is indicated as Reactor 3.1 and the downstream reaction zone as Reactor 3.2.

| | Temp. inlet [° C.] | Temp. outlet [° C.] | Conversion [%] | GHSV [1/h] |
|---|---|---|---|---|
| Reactor 1 | 750 | 461.1 | 28.6 | 3000 |
| Reactor 2 | 750 | 505.0 | 53.9 | 3859 |
| Reactor 3.1 | 750 | 580.8 | 71.9 | 4617 |
| Reactor 3.2 | 580.8 | 373.5 | 94.3 | |
| Reactor 4 | 750 | 700.7 | 99.8 | 5830 |

As can be gathered from the results shown in Table 4, the third reactor, which was zoned, leads to a higher conversion. In particular, a conversion of 94.3% was measured after the third reactor whereas a conversion of 76.3% was measured after the third reactor for the production unit according to Comparative Example 1, whereby the same conditions, in particular the same pressure, were applied. In addition thereto, the $NH_3$ conversion after the fourth reactor was significantly improved. In particular, a conversion of 99.8% was determined after the fourth reactor, whereas a conversion of 94.7% was determined after the fourth reactor for the production unit according to Comparative Example 1. As can be taken from the results shown in FIG. 7, the conversion was determined as being 53.9% at the reactor inlet and 94.3% at the reactor outlet, meaning that over 40% of the total conversion in the production unit was achieved in the third reactor alone. In contrast thereto, the third reactor of the production unit according to Comparative Example 1 only achieved about 22% of the total conversion in the production unit.

3.2.2 Simulation at a Pressure of 20 Bara, and Initial GHSV of 3000 $h^{-1}$ for the First Reactor Table 5

Temperatures of the inlet and outlet streams at 20 bara and the $NH_3$ conversion values of the four reactors, wherein the third reactor was zoned. The upstream reaction zone of the third reactor is indicated as Reactor 3.1, and the downstream reaction zone as Reactor 3.2.

| | Temp. inlet [° C.] | Temp. outlet [° C.] | Conversion [%] | GHSV [1/h] |
|---|---|---|---|---|
| Reactor 1 | 750 | 481.7 | 26.6 | 3000 |
| Reactor 2 | 750 | 526.3 | 49.7 | 3800 |
| Reactor 3.1 | 750 | 600.2 | 65.5 | 4490 |
| Reactor 3.2 | 600.2 | 400.5 | 86.9 | |
| Reactor 4 | 750 | 644.6 | 98.4 | 5605 |

As can be gathered from the results shown in Table 5, the third reactor, which was zoned, leads to a higher conversion. In particular, a conversion of 86.9% was measured after the third reactor whereas a conversion of 70.0% was measured after the third reactor for the production unit according to Comparative Example 1, whereby the same conditions, in particular the same pressure, were applied. In addition thereto, the $NH_3$ conversion after the fourth reactor was significantly improved. In particular, a conversion of 98.4% was measured after the fourth reactor, whereas a conversion of 87.3% was measured after the fourth reactor for the production unit according to Comparative Example 1. As can be taken from the results shown in FIG. 8, the conversion was determined as being 49.7% at the reactor inlet and 86.9% at the reactor outlet, meaning that over 37% of the total conversion in the production unit was achieved in the third reactor alone. In contrast thereto, the third reactor of the production unit according to Comparative Example 1 only achieved about 22% of the total conversion in the production unit.

3.2.3 Simulation at a Pressure of 20 Bara, and Initial GHSV of 9000 $h^{-1}$ for the First Reactor Table 6

Temperatures of the inlet and outlet streams at 20 bara and the $NH_3$ conversion values of the four reactors, wherein the third reactor was zoned. The upstream reaction zone of the third reactor is indicated as Reactor 3.1, and the downstream reaction zone as Reactor 3.2.

| | Temp. inlet [° C.] | Temp. outlet [° C.] | Conversion [%] | GHSV [1/h] |
|---|---|---|---|---|
| Reactor 1 | 750 | 538.3 | 21.1 | 9000 |
| Reactor 2 | 750 | 583.9 | 38.1 | 10898 |
| Reactor 3.1 | 750 | 649.8 | 48.6 | 12431 |
| Reactor 3.2 | 649.8 | 383.9 | 76.5 | |
| Reactor 4 | 750 | 661.4 | 86.1 | 15883 |

As can be gathered from the results shown in Table 6, the third reactor, which was zoned, leads to a higher conversion. In particular, a conversion of 76.5% was measured after the third reactor, wherein a GSHV of 12431 $h^{-1}$ was applied, whereas a conversion of 70.0% was measured after the third reactor for the production unit according to Comparative Example 1, wherein a GHSV of 4490 $h^{-1}$ was applied. Further, the $NH_3$ conversion after the fourth reactor was slightly lower than for the production unit according to Comparative Example 1, but the GSHV was comparatively higher. In particular, a conversion of 86.1% was measured after the fourth reactor, wherein a GHSV of 15883 $h^{-1}$ was applied, whereas a conversion of 87.3% was measured after the fourth reactor for the production unit according to Comparative Example 1, wherein a GHSV of 5100 $h^{-1}$ was applied. As can be taken from the results shown in FIG. 9, the conversion was determined as being 38.1% at the reactor inlet and 76.5% at the reactor outlet, meaning that over 38% of the total conversion in the production unit was achieved in the third reactor alone. In contrast thereto, the third reactor of the production unit according to Comparative Example 1 only achieved about 22% of the total conversion in the production unit.

Example 4: Production Unit Comprising One Zoned Reactor and Three Non-Zoned Reactors-Influence of Varying Amounts 4.1 Assembly of Production Unit A production unit comprising four reactors was provided. The third reactor in the direction of the $NH_3$ feed stream was filled in the upstream reaction zone with the Ni-containing catalyst according to Reference Example 3 and in the downstream reaction zone with the Ru-containing catalyst according to Reference Example 4. The volume ratio of the reaction zone comprising the Ni-containing catalyst to the reaction zone comprising the Ru-containing catalyst was varied as detailed in Table 7 below. The other reactors were filled with the Ni-containing catalyst according to Reference Example 3.

4.2 Simulation of Catalytic Activity

According to Reference Example 2, the reforming of $NH_3$ was simulated for said adiabatic reactor cascade at a pressure of 20 bara and an initial GHSV of 3000 $h^{-1}$ for the first reactor and an initial GHSV of 3000 $h^{-1}$ for the first reactor. The initial temperature was set to 750° C. for each reactor in all simulations. The results for the simulated reforming of $NH_3$ are shown in Table 7 below.

Table 7

Temperatures of the inlet and outlet streams at 20 bara and the $NH_3$ conversion values of the third and fourth reactor, wherein the third reactor was zoned.

| Volume ratio of Ni-cont. cat. reaction zone to Ru-cont. cat. reaction zone | 3rd reactor conversion X [%] | Temp. outlet 3rd reactor [° C.] | 4th reactor conversion X [%] | Temp. outlet 4th reactor [° C.] |
|---|---|---|---|---|
| 0.01:0.99 | 86.9 | 400.5 | 98.4 | 644.7 |
| 0.1:0.9 | 86.9 | 400.5 | 98.4 | 644.7 |
| 0.25:0.75 | 86.9 | 400.5 | 98.4 | 644.7 |
| 0.5:0.5 | 86.9 | 400.5 | 98.4 | 644.6 |
| 0.75:0.25 | 86.6 | 402.8 | 98.4 | 642.9 |
| 0.9:0.1 | 84.5 | 421.8 | 97.6 | 631.2 |
| 0.99:0.01 | 75.1 | 509.7 | 91.3 | 600.7 |

As can be gathered from the results shown in Table 7, a volume ratio of 25:75 of the reaction zone comprising the Ru-containing catalyst to the reaction zone comprising the Ni-containing catalyst in the third reactor leads to high conversions of 98.4% after reactor four. Even the implementation of a reaction zone comprising the Ru-containing catalyst of only 1 volume-% shows already a significant conversion improvement after the third reactor. In particular, a conversion of 75.1% was measured after the third reactor, whereas a conversion of 70.0% was measured after the third reactor for the production unit according to Comparative Example 1 at 20 bara.

Example 5: Production Unit Comprising Three Reactors Wherein Two Reactors are Zoned 5.1 Assembly of Production Unit A production unit comprising three reactors was provided. The first and second reactor in the direction of the $NH_3$ feed stream were respectively filled in the upstream reaction zone with the Ni-containing catalyst according to Reference Example 3 and in the downstream reaction zone with the Ru-containing catalyst according to Reference Example 4 to give two zoned reactors. The volume ratio of the reaction zone comprising the Ni-containing catalyst to the reaction zone comprising the Ru-containing catalyst was 1:1 for both reactors. The third reactor was filled with the Ni-containing catalyst according to Reference Example 3.

5.2 Simulation of Catalytic Activity

According to Reference Example 2, the reforming of $NH_3$ was simulated for said adiabatic reactor cascade at a pressure of 20 bara and an initial GHSV of 3000 $h^{-1}$ for the first reactor. The initial temperature was set to 750° C. for each reactor. The results for the simulated reforming of $NH_3$ are shown in FIG. 10 and Table 8 below, respectively.

Table 8

Temperatures of the inlet and outlet streams at 20 bara and the $NH_3$ conversion values of the three reactors, wherein the first and second reactors were zoned. The upstream reaction zone of a reactor is indicated as Reactor x.1, and the downstream reaction zone as Reactor x.2.

| | Temp. inlet [° C.] | Temp. outlet [° C.] | Conversion [%] | GHSV [1/h] |
|---|---|---|---|---|
| Reactor 1.1 | 750 | 517.2 | 23.2 | 3000 |
| Reactor 1.2 | 517.2 | 297.5 | 44.6 | |
| Reactor 2.1 | 750 | 593.4 | 61.1 | 4339 |
| Reactor 2.2 | 593.4 | 381.6 | 83.6 | |
| Reactor 3 | 750 | 626.9 | 97.1 | 5508 |

As can be gathered from the results shown in Table 8, the implementation of two zoned reactors in the production unit leads to a comparatively higher conversion after two reactor stages. In particular, a conversion of 83.6% was determined after the second reactor, whereas a conversion of 49.7% was determined after the second reactor for the production unit according to Comparative Example 1. Thus, implementation of a third reactor in the production unit is sufficient to reach equilibrium conversion, in particular a conversion of 98.3% at 615.7° C. as shown in FIG. 10, such that implementation of a fourth reactor becomes obsolete.

CITED LITERATURE

Figure 1:
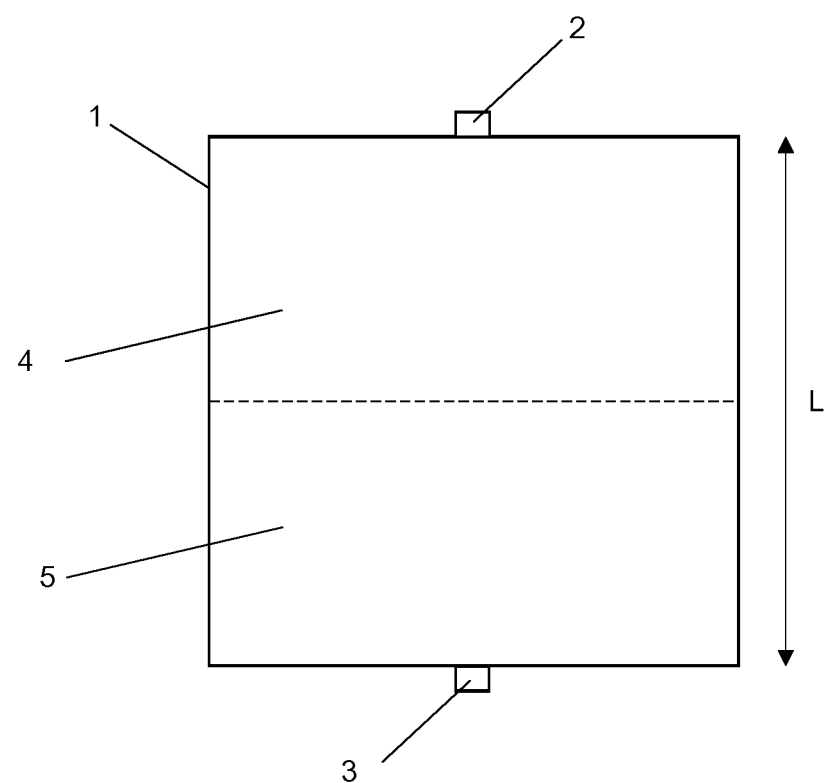
FIG. 1: shows a schematic view of a zoned reactor (1) with two zones. The reactor inlet (2) is separated by the axial length L of the reactor from the reactor outlet (3). The inlet reaction zone (4) is located adjacent to the reactor inlet and the outlet reaction zone (5) is located adjacent to the reactor outlet.
Figure 2:
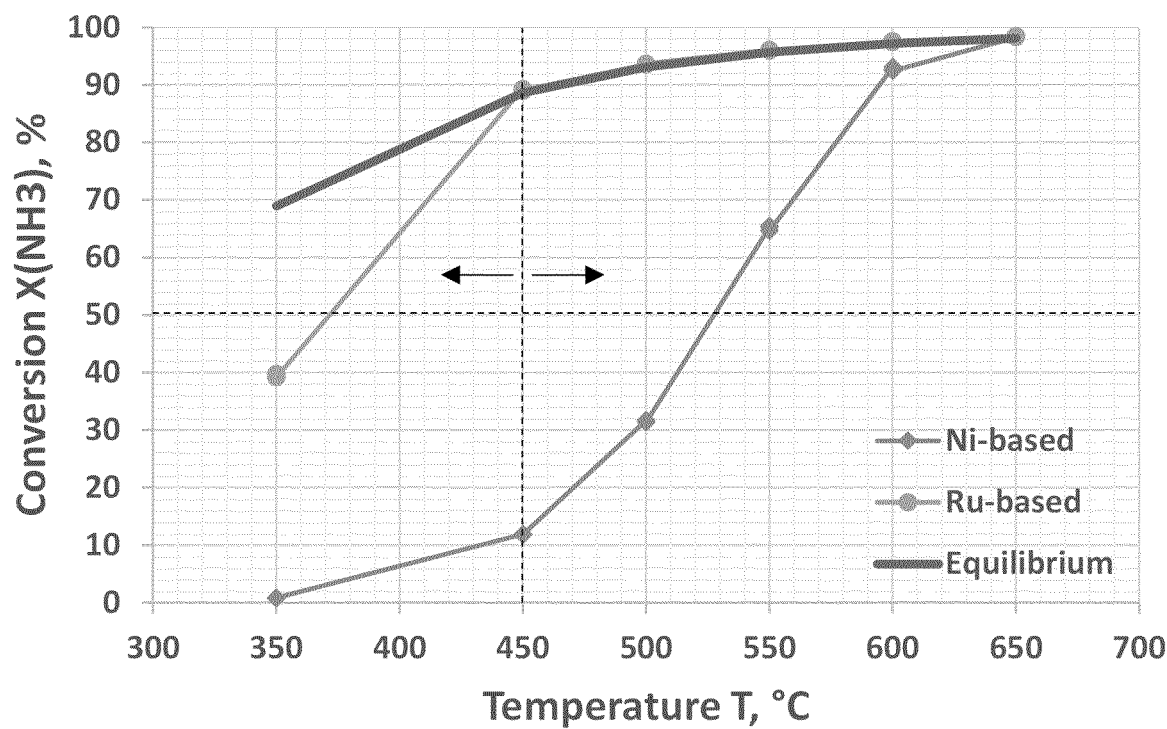
FIG. 2: shows the results for the determination of the T50 light-off temperature in accordance with Reference Example 1 for the Ni-containing catalyst according to Reference Example 3 and the Ru-containing catalyst according to Reference Example 4. The equilibrium conversion is shown with a thick solid line. The arrows and dotted lines indicate a classification as high or low temperature active catalyst, wherein a catalyst exhibiting a $NH_3$ conversion of 50% at a temperature of equal to or lower than 450° C. can be classified as low temperature active catalyst, and a catalyst exhibiting a $NH_3$ conversion of 50% at a temperature of higher than 450° C. can be classified as high temperature active catalyst.
Figure 3:
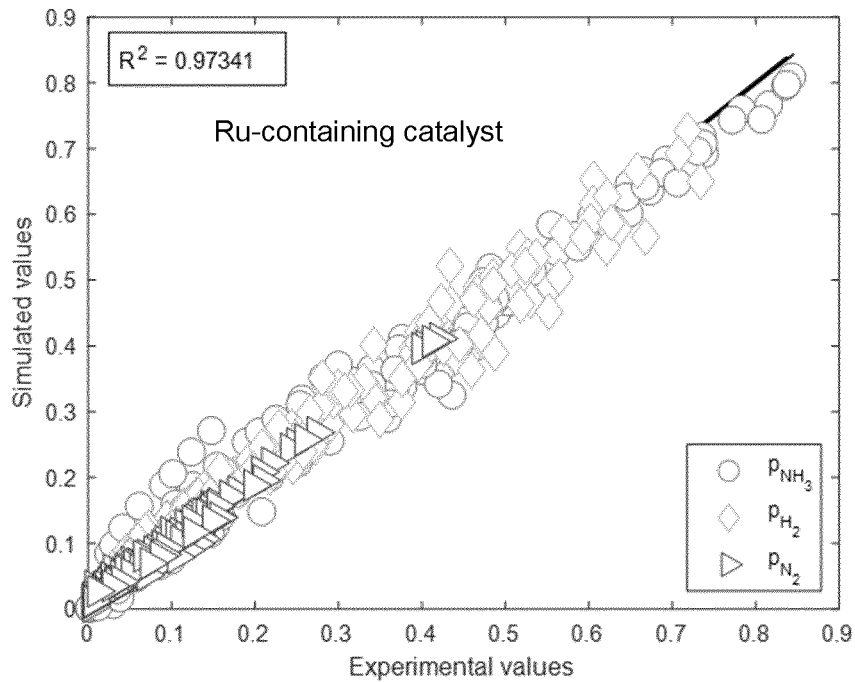
FIG. 3: shows the parity plots of the simulated and experimental values for the partial pressures of $NH_3$, $N_2$ and $H_2$ for the Ru-containing catalyst (FIG. 3A) according to Reference Example 4 and the Ni-containing catalyst (FIG. 3B) according to Reference Example 3, respectively.
Figure 3:
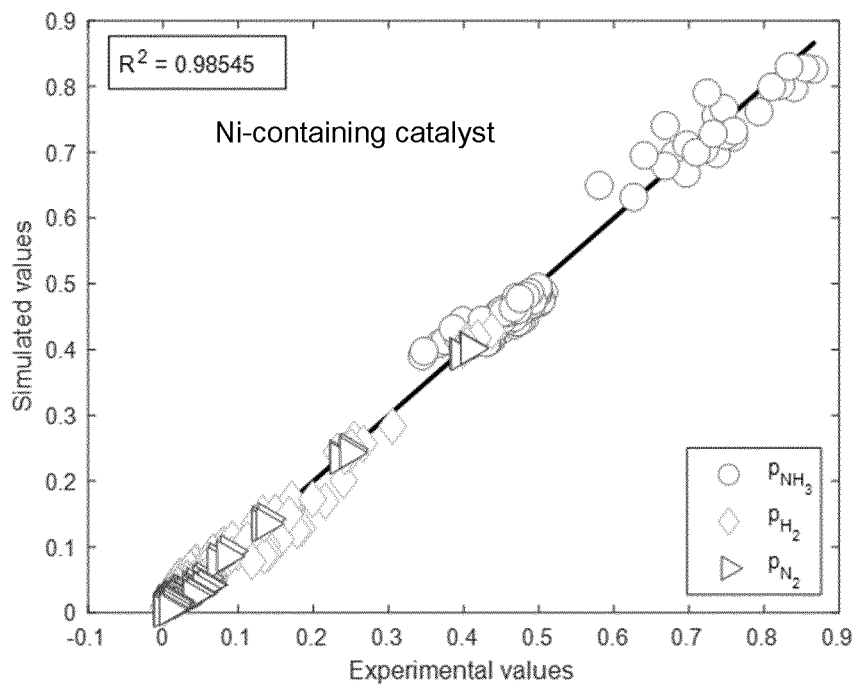
Figure 4:
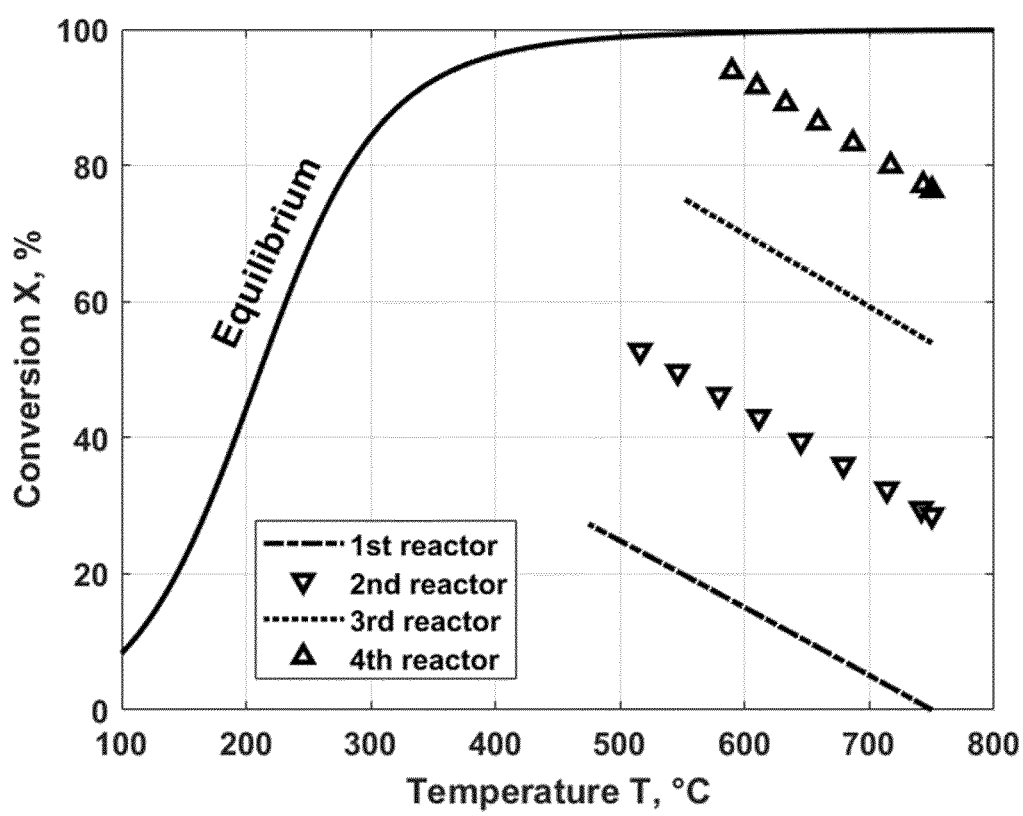
FIG. 4: shows the $NH_3$ conversion as function of the temperature at 5 bara, simulated for the production unit according to Comparative Example 1. The temperature is shown on the abscissa in ° C., and the conversion is shown on the ordinate in %.
Figure 5:
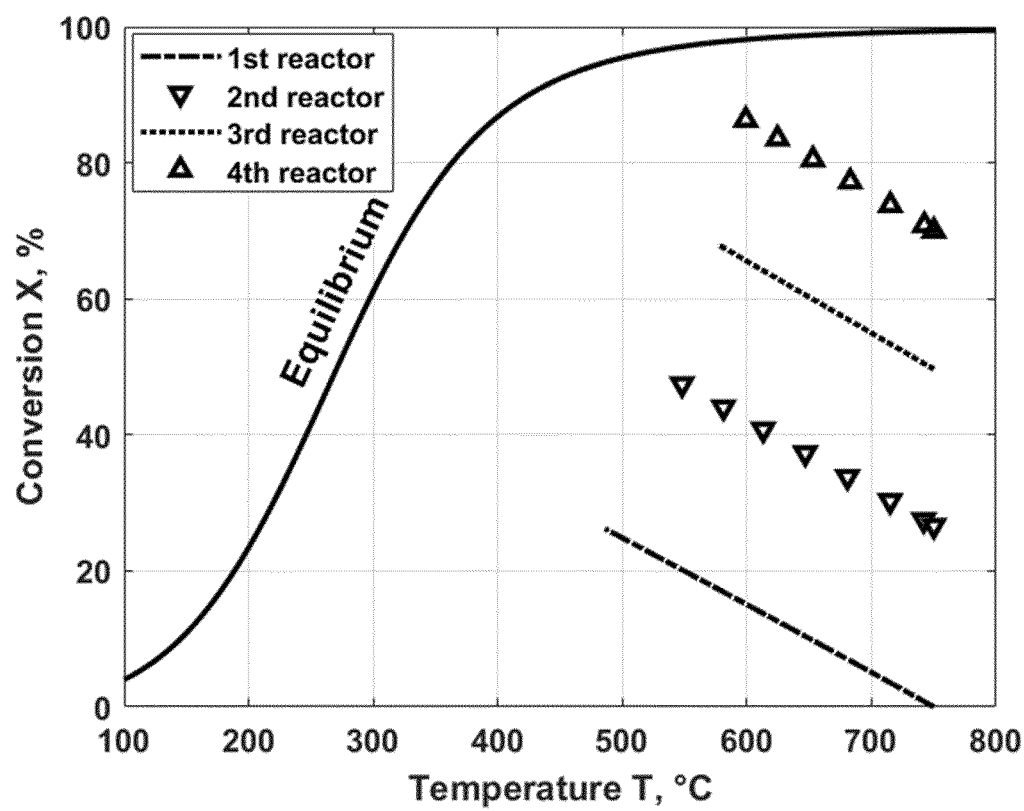
FIG. 5: shows the $NH_3$ conversion as function of the temperature at 20 bara, simulated for the production unit according to Comparative Example 1. The temperature is shown on the abscissa in ° C., and the conversion is shown on the ordinate in %.
Figure 6:
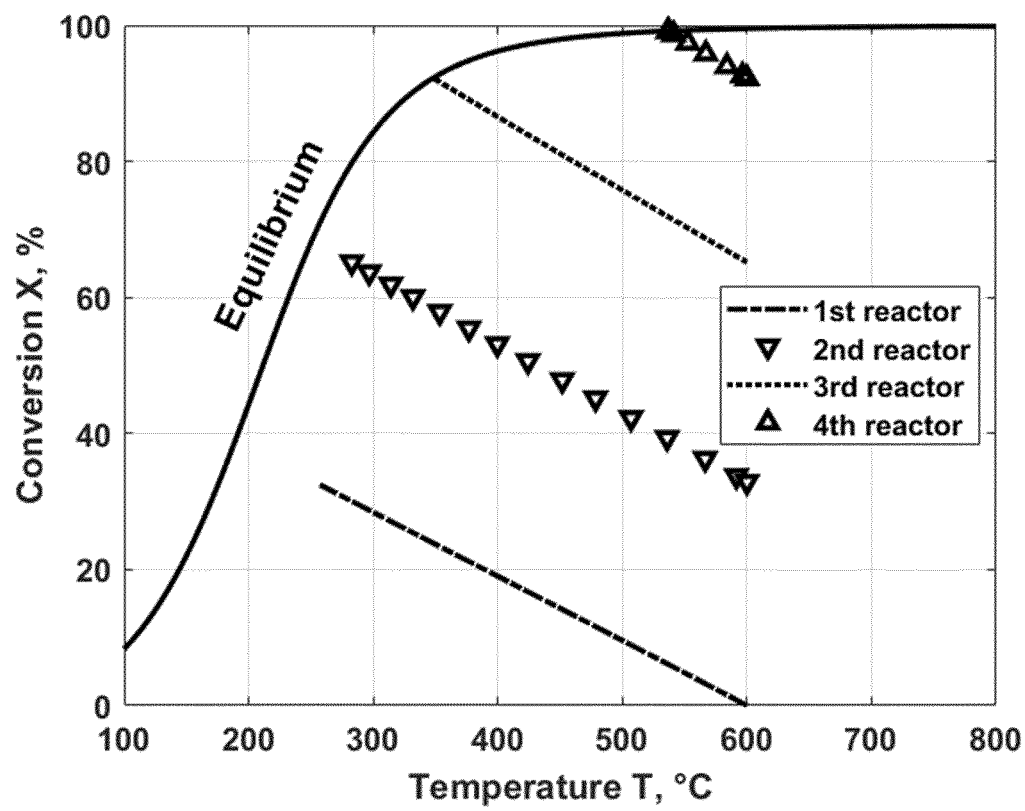
FIG. 6: shows the $NH_3$ conversion as function of the temperature at 5 bara, simulated for the production unit according to Comparative Example 2. The temperature is shown on the abscissa in ° C., and the conversion is shown on the ordinate in %.
Figure 7:
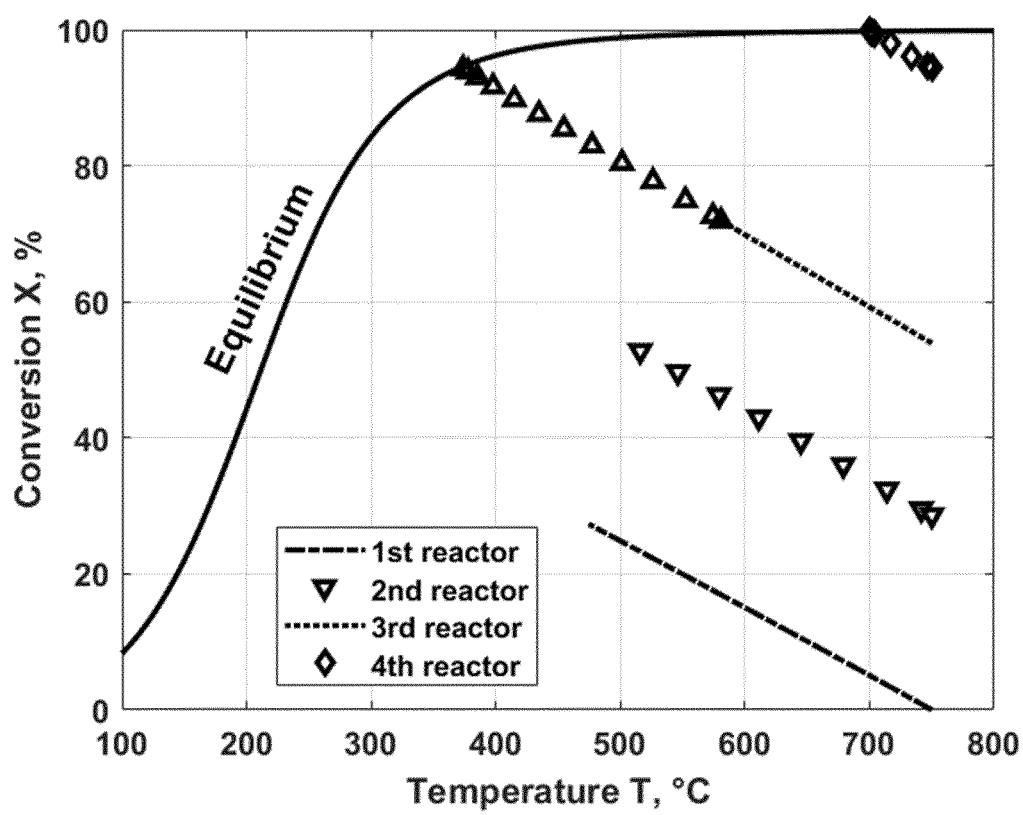
FIG. 7: shows the $NH_3$ conversion as function of the temperature at 5 bara and an initial GHSV of 3000 $h^{-1}$, simulated for the production unit according to Example 3. The temperature is shown on the abscissa in ° C., and the conversion is shown on the ordinate in %.
Figure 8:
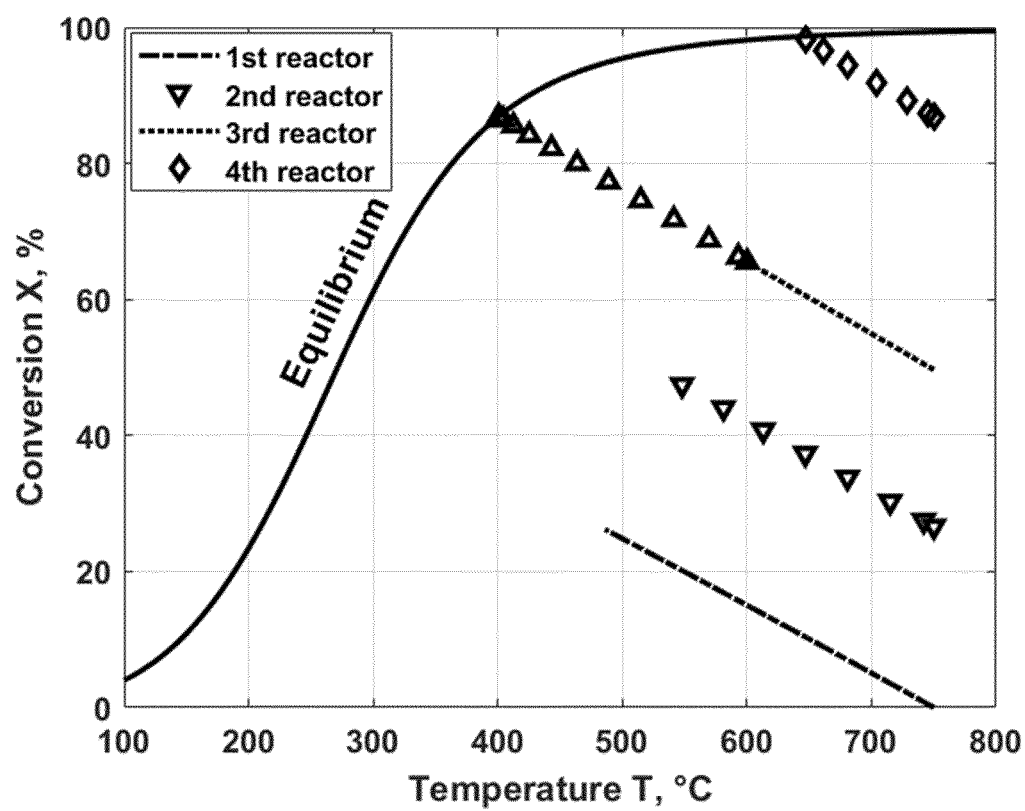
FIG. 8: shows the $NH_3$ conversion as function of the temperature at 20 bara and an initial GHSV of 3000 $h^{-1}$, simulated for the production unit according to Example 3. The temperature is shown on the abscissa in ° C., and the conversion is shown on the ordinate in %.
Figure 9:
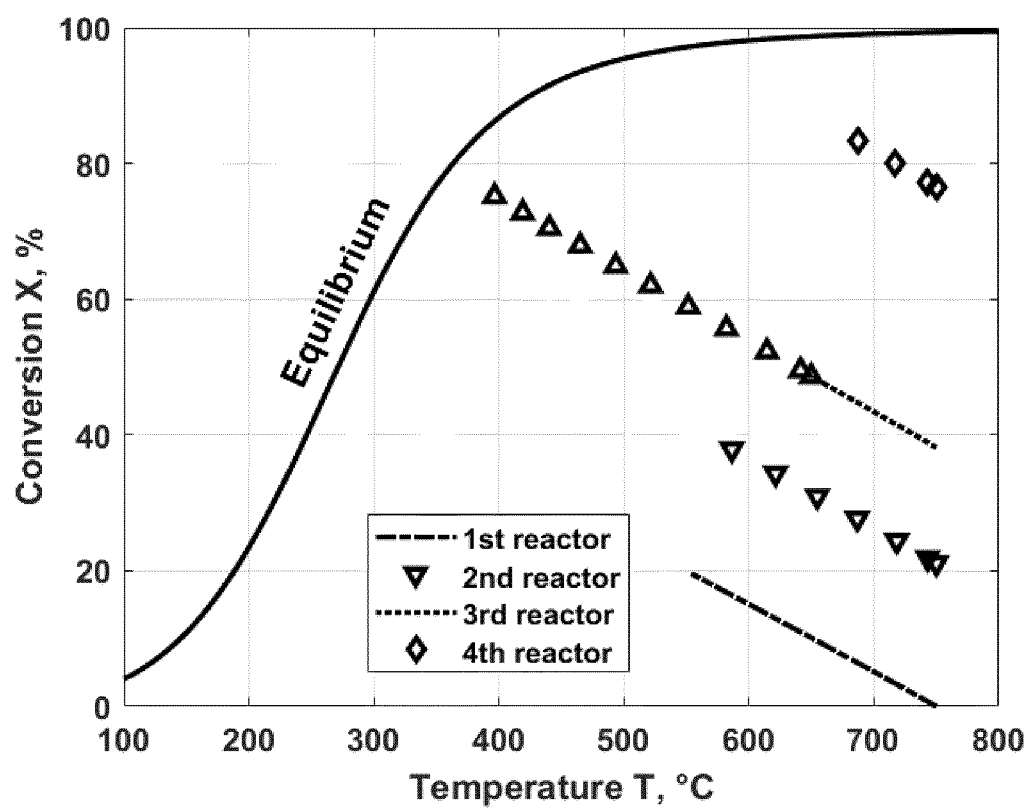
FIG. 9: shows the $NH_3$ conversion as function of the temperature at 20 bara and an initial GHSV of 9000 $h^{-1}$, simulated for the production unit according to Example 3. The temperature is shown on the abscissa in ° C., and the conversion is shown on the ordinate in %.
Figure 10:
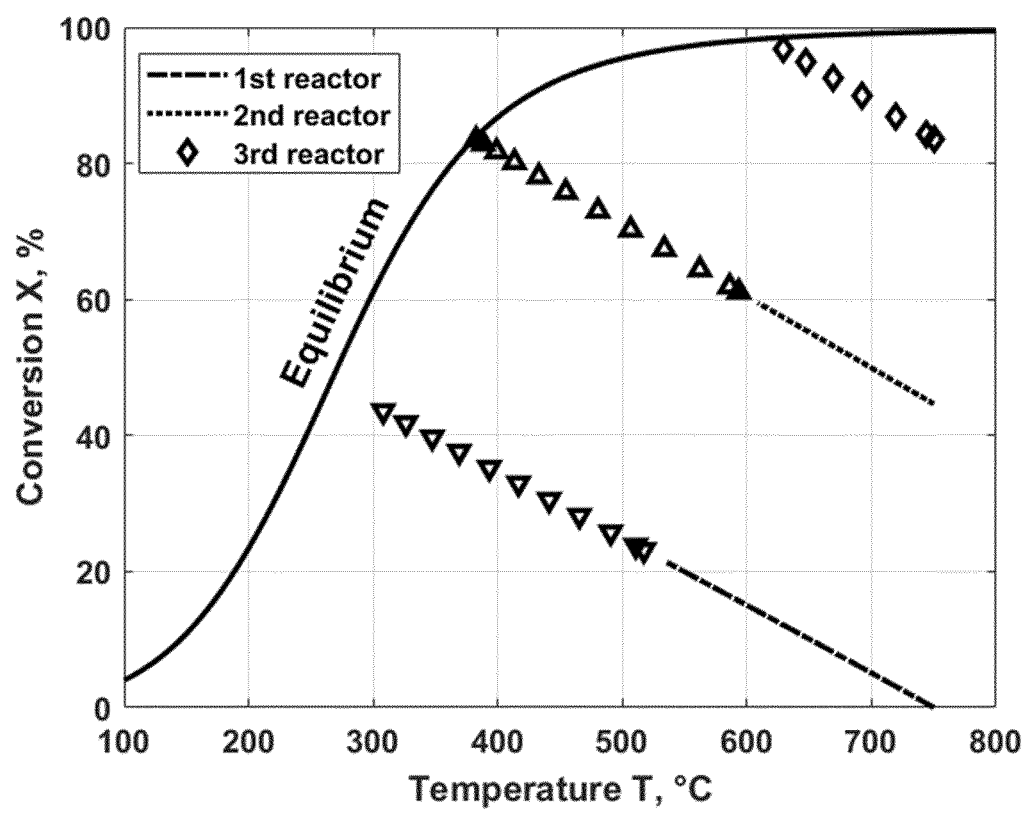
FIG. 10: shows the $NH_3$ conversion as function of the temperature at 20 bara, simulated for the production unit according to Example 5. The temperature is shown on the abscissa in ° C., and the conversion is shown on the ordinate in %.

US 2020/0062590 A1
WO 2013/004649 A1
S. Osborne et al., Nitrogen+Syngas, 373, September-October 2021, p. 44-50

The invention claimed is:

1. A zoned reactor for the reforming of $NH_3$ to $N_2$ and $H_2$, wherein the reactor is an adiabatic rector, and wherein the reactor comprises
 a reactor inlet and a reactor outlet, the reactor inlet and the reactor outlet being separated by the axial length L of the reactor, and
 n reaction zones arranged in sequence and extending from the reactor inlet to the reactor outlet along the axial length L of the reactor, wherein n is an integer in the range of from 2 to 5,
 wherein the length of each of the n reaction zones in axial direction constitutes a fraction of the length L of the reactor, wherein the sum of the lengths of all of the reaction zones in axial direction is less than or equal to L,
 wherein independently from one another, each of the n reaction zones comprises one or more catalytic components,
 wherein the inlet reaction zone which is adjacent to the reactor inlet displays a higher light-off temperature T50 in the reforming of $NH_3$ to $N_2$ and $H_2$ than each of the one or more subsequent reaction zones downstream thereof,
 wherein the outlet reaction zone which is adjacent to the reactor outlet displays a lower light-off temperature T50 in the reforming of $NH_3$ to $N_2$ and $H_2$ than each of the one or more preceding reaction zones upstream thereof, and
 wherein each of the optional intermediate reaction zones between the inlet and outlet reaction zones respectively displays a light-off temperature T50 in the reforming of $NH_3$ to $N_2$ and $H_2$ which is lower than each of the one or more preceding reaction zones upstream thereof and which is higher than each of the one or more subsequent reaction zones downstream thereof, wherein the T50 light-off temperature is determined according to Reference Example 1.

2. The reactor of claim 1, wherein the inlet reaction zone displays a T50 light-off temperature higher than 450° C.

3. The reactor of claim 1, wherein the outlet reaction zone displays a T50 light-off temperature equal to or lower than 450° C.

4. The reactor of claim 1, wherein n is an integer in the range of from 2 to 5.

5. The reactor of claim 1, wherein each of the reaction zones independently from one another has a length in the range of from $(0.01 \cdot L/n)$ to $(1.99 \cdot L/n)$.

6. The reactor of claim 1, wherein the one or more catalytic components comprised in each of the n reaction zones are independently from one another selected from the group consisting of Ni-containing catalysts, Fe-containing catalysts, Co-containing catalysts, Ru-containing catalysts, and mixtures thereof.

7. The reactor of claim 6, wherein the one or more Co-containing catalysts and/or the one or more Ni-containing catalysts comprise a further metal M selected from the group consisting of alkali metals, alkaline earth metals, Mo, and Fe, including mixtures of two or more thereof.

8. The reactor of claim 6, wherein the one or more Ni-containing catalysts comprise Ni in an amount in the range of from 5 to 25 wt.-%, based on 100 wt.-% of the total weight of the one or more Ni-containing catalyst.

9. The reactor of claim 6, wherein the one or more Ru-containing catalysts comprises Ru in an amount in the range of from 0.5 to 15 wt.-% based on 100 wt.-% of the total amount of the one or more support materials.

10. The reactor of claim 6, wherein the one or more Ru-containing catalysts further comprises one or more alkali metal and/or alkaline earth metal hydroxides.

11. The reactor of claim 1, wherein the one or more catalytic components are in the form of moldings and/or in powder form.

12. A production unit for the reforming of $NH_3$ to $N_2$ and $H_2$, the production unit comprising k adiabatic reactors each comprising a reactor inlet and a reactor outlet, wherein at least one of the reactors is a zoned reactor according to claim 1, wherein k is an integer in the range of from 1 to 6, wherein the reactors are arranged in sequence along the reaction stream, and
 wherein a heating component is arranged upstream of each of the k reactors.

13. The production unit of claim 12, wherein one and the same heating unit is arranged upstream of each of the k reactors.

14. A process for the reforming of $NH_3$ to $N_2$ and $H_2$, the process comprising
 (i) providing a zoned reactor according to claim 1,
 (ii) providing a feed gas stream comprising $NH_3$;
 (iii) feeding the feed gas stream provided in (ii) into the reactor according to claim 1 provided in (i), wherein feeding is performed at a pressure of the feed gas stream in the range of from 1 to 80 bara, and at a temperature of the feed gas stream in the range of from 175 to 825° C.;
 (iv) removing a product gas stream from the reactor or from the production unit provided in (i), the product gas stream comprising $N_2$ and $H_2$.

15. A method comprising reforming of $HN_3$ to $N_2$ and $H_2$ in a reactor according to claim 1.

* * * * *